(12) United States Patent
Jeong et al.

(10) Patent No.: US 10,671,210 B2
(45) Date of Patent: *Jun. 2, 2020

(54) ELECTRONIC DEVICE

(71) Applicant: Samsung Display Co., Ltd., Yongin-si (KR)

(72) Inventors: Hwan-hee Jeong, Cheonan-si (KR); Yeontae Kim, Yongin-si (KR); Taejoon Kim, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,142

(22) Filed: Oct. 12, 2018

(65) Prior Publication Data

US 2019/0042052 A1 Feb. 7, 2019

Related U.S. Application Data

(63) Continuation of application No. 15/361,944, filed on Nov. 28, 2016, now Pat. No. 10,126,864.

(30) Foreign Application Priority Data

May 19, 2016 (KR) .......................... 10-2016-0061584

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04111* (2013.01); *G06F 2203/04112* (2013.01)

(58) Field of Classification Search
CPC ...... G06F 3/0416; G06F 3/0412; G06F 3/044; G06F 3/047; G06F 2203/04111; G06F 2203/04112; G06F 2203/04103
See application file for complete search history.

(56) References Cited

U.S. PATENT DOCUMENTS 9,280,233 B1 * 3/2016 Tong .................... G06F 3/0416
9,360,977 B2 6/2016 Aberg
(Continued)

FOREIGN PATENT DOCUMENTS

CN 103975297 8/2014
CN 104271345 1/2015
(Continued)

OTHER PUBLICATIONS

First Office Action dated Sep. 10, 2019, issued in the Chinese Patent Application No. 201710355981.5.
(Continued)

*Primary Examiner* — Tom V Sheng
(74) *Attorney, Agent, or Firm* — H.C. Park & Associates, PLC

(57) ABSTRACT

An electronic device having a touch screen or display to reduce or eliminate visibility of structures in the device due to reflected light includes a base member and a touch member disposed on one surface of the base member and including first and second sensor parts spaced apart from each other with a boundary interposed therebetween. Each of the first and second sensor parts includes first and second areas disposed adjacent to each, a plurality of first patterns in the first area spaced apart from each other and a plurality of second patterns in the second area spaced apart from the first patterns. Each of the first patterns has a first shape, and each of the second patterns has a second shape different than the first shape. Various embodiments of patterns having (Continued)

shapes selected to reduce or eliminate visibility are disclosed.

29 Claims, 31 Drawing Sheets

(56) References Cited

U.S. PATENT DOCUMENTS

| | | | |
|---|---|---|---|
| 9,372,360 B2 | 6/2016 | Wang et al. | |
| 9,625,940 B2 | 4/2017 | Kim et al. | |
| 9,706,653 B2 | 7/2017 | Yoon et al. | |
| 10,126,864 B2* | 11/2018 | Jeong | G06F 3/0416 |
| 2011/0074733 A1* | 3/2011 | Makinen | G09B 21/004 |
| | | | 345/174 |
| 2012/0044203 A1 | 2/2012 | Ishizaki et al. | |
| 2012/0056824 A1* | 3/2012 | Liu | G06F 3/041 |
| | | | 345/173 |
| 2012/0235836 A1* | 9/2012 | Kikuchi | G06F 3/0416 |
| | | | 341/20 |
| 2012/0312466 A1* | 12/2012 | Hu | B82Y 30/00 |
| | | | 156/268 |
| 2012/0313885 A1* | 12/2012 | Cheng | G06F 3/044 |
| | | | 345/174 |
| 2012/0313886 A1* | 12/2012 | Hu | G06F 3/044 |
| | | | 345/174 |
| 2014/0098304 A1* | 4/2014 | Kim | G06F 3/044 |
| | | | 349/12 |
| 2015/0125680 A1 | 5/2015 | Araki et al. | |
| 2015/0220179 A1* | 8/2015 | Kimura | G06F 3/044 |
| | | | 345/174 |
| 2016/0103509 A1* | 4/2016 | Yen | G06F 3/044 |
| | | | 345/173 |
| 2016/0231853 A1* | 8/2016 | Weng | G06F 3/044 |
| 2016/0370916 A1* | 12/2016 | Hashimoto | G06F 3/044 |
| 2017/0102804 A1 | 4/2017 | Kikukawa et al. | |

FOREIGN PATENT DOCUMENTS

| | | |
|---|---|---|
| CN | 105144045 | 12/2015 |
| EP | 2985684 | 2/2016 |
| JP | 2012-185813 | 9/2012 |
| KR | 10-2010-0095868 | 9/2010 |
| KR | 10-2010-0095886 | 9/2010 |
| KR | 10-1373044 | 3/2014 |
| KR | 10-2014-0044651 | 4/2014 |
| KR | 10-1402825 | 5/2014 |
| KR | 10-2015-0097055 | 8/2015 |
| WO | 2015/156316 | 10/2015 |

OTHER PUBLICATIONS

Non-Final Office Action dated Jan. 11, 2018, in U.S. Appl. No. 15/361,944.

Notice of Allowance dated Jul. 13, 2018, in U.S. Appl. No. 15/361,944.

Office Action dated Apr. 13, 2018, in the Korean Patent Application No. 10-2016-0061584.

* cited by examiner

ELECTRONIC DEVICE

CROSS-REFERENCE TO RELATED APPLICATION

This application is a Continuation of U.S. patent application Ser. No. 15/361,944, filed on Nov. 28, 2016, and claims priority from and the benefit of Korean Patent Application No. 10-2016-0061584, filed on May 19, 2016, which is hereby incorporated by reference for all purposes as if fully set forth herein.

BACKGROUND

Field

The invention relates generally to an electronic device, and more particularly, to an electronic device having a display capable of preventing undesired patterns from being perceived when external light is reflected by the electronic device.

Discussion of the Background

An electronic device is activated in response to an electrical signal. The electronic device includes a display device displaying an image and/or a touch screen sensing an external touch from a user or other external input.

The electronic device includes various electrode patterns activated by the electrical signal. An area in which the electrode patterns are activated displays information and/or reacts to the external touch. However, patterns are evident in reflections of external light reflected from within the device. Such patterns in reflected light are undesirable.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments of the invention provide an electronic device capable of reducing or preventing areas in displays and touch sensors from being perceived due to the reflection of external light from within the device by providing patterns that reduce the visibility of areas in the display and touch sensors that reflect light differently.

Additional aspects will be set forth in the detailed description which follows, and, in part, will be apparent from the disclosure, or may be learned by practice of the inventive concept.

According to one aspect of the invention, an electronic device may include a base member and a touch member disposed on one surface of the base member and including first and second sensor parts spaced apart from each other with a boundary interposed therebetween. Each of the first and second sensor parts includes first and second areas disposed adjacent to each other. Each of the first and second sensor parts includes a plurality of first patterns in the first area and spaced apart from each other, each of the first patterns having a first shape, and a plurality of second patterns in the second area and spaced apart from the first patterns, each of the second patterns having a second shape different than the first shape.

The first shape may be a substantially closed-loop shape and the second shape may be a partially open shape.

At least one of the first and second patterns is a cut-away pattern.

The boundary may be defined by the second area of the first sensor part and the second area of the second sensor part disposed adjacent to the second area of the first sensor part.

The first area may have a quadrangular shape defined by two sides extending in a first direction and two sides extending in a second direction intersecting the first direction, and the first patterns may be arranged in a matrix form extending in the first and second directions.

The second area may surround the first area.

The second patterns are aligned with the first patterns adjacent to the second patterns in the first direction or the second direction.

The second patterns of the first sensor part arranged in the first direction may be aligned, in the second direction, with the second patterns of the second sensor part arranged in the first direction.

One of the second patterns may have substantially the same shape and orientation as the shape and orientation as another one of the second patterns, the another one of the second patterns being adjacent to the first one of the second patterns.

One of the second patterns may have a shape linearly symmetrical with the shape of another one of the second patterns, the another one of the second patterns being adjacent to the first one of the second patterns.

One of the second patterns may have a shape substantially rotationally symmetrical with the shape of another one of the second patterns adjacent to the one of the second patterns.

A first one of the second patterns may have a shape symmetrical with a shape of another one of the second patterns by a point symmetry, the another one of the second cut-away patterns being adjacent to the first one of second patterns.

The electronic device may further include a plurality of third patterns defined in the second areas, wherein at least some of the third patterns have a third shape different from the first and second shapes.

The third cut-away patterns may be connected to respective ones of the second patterns.

The electronic device may further include a plurality of fourth patterns defined in the second areas, wherein at least some of the fourth patterns have a fourth shape that is different than the first and second shapes and no portion of any of the fourth patterns is connected to any portion of any of the second or the third patterns in the second areas.

At least some of the plurality of fourth shapes may have substantially the same shape as at least a portion of two connected sides of the first shape or the second shape.

The third cut-away patterns may be adjacent to the boundary.

The second area may include a plurality of protruding areas arranged spaced apart from each other.

First protruding areas may be among the protruding areas of the first sensor part, the first protruding areas protruding from the first sensor part toward the second sensor part, second protruding areas may be among the protruding areas of the second sensor part, the second protruding areas protruding from the second sensor part toward the first sensor part, and individual ones of the first protruding areas may alternate with individual ones of the second protruding areas in a first direction or a second direction.

The boundary may be defined along a junction between an outer side portion of the first protruding areas and an outer side portion of the second protruding areas.

A portion of the boundary may be defined by the first protruding areas and the first area of the second sensor part adjacent to the first protruding areas, and another portion of the boundary may be defined by the second protruding areas and the first area of the first sensor part adjacent to the second protruding areas.

Each of the first and second protruding areas may include a first sub-area in which at least one second cut-away pattern of the second cut-away patterns is located and a second sub-area in which at least one third cut-away pattern of the third cut-away patterns is located.

The first and second protruding areas may be arranged in a one of the first direction and the second direction and a width of the first sub-area in the one of the first direction and the second direction may be greater than a width of the second sub-area in the one of the first direction and the second direction.

The second cut-away pattern may be adjacent to the boundary.

A shape, which is defined by a portion of the boundary surrounding the second sub-area and by the third pattern connected to the portion of the boundary surrounding the second sub-area, may correspond to a shape of the second pattern defined in the first sub-area.

Each of the first patterns may have a quadrangular shape defined by four cut-away sides, each of the second patterns may have a shape obtained by not cutting away a portion of one of the four sides, and each of the third patterns may have a shape corresponding to the portion of the one side not cut away.

The electronic device may further include a display layer disposed on the base member to display an image, and an insulating layer disposed between the display layer and the touch member to cover the display layer, wherein the touch member is directly disposed on the insulating layer.

The electronic device may further include a cover layer disposed on the base member, and a display layer disposed between the base member and the cover layer to display an image, wherein the touch member is disposed between the display layer and the base member.

According to another aspect employing the inventive concepts, an exemplary embodiment of an electronic device may include a display layer comprising a plurality of pixels; and a sensor including a first and second sensor parts disposed on one surface of the display layer, each of the first and second sensor parts having a conductivity and being spaced apart from each other by a boundary, the sensor including a plurality of center areas disposed in each of the first and second sensor parts, and a peripheral area disposed adjacent to the center areas and defining the boundary, wherein a plurality of first patterns may be provided in each of the center areas, the first patterns may be disposed spaced apart from each other and have a first shape defining a first area, and a plurality of second patterns may be provided in the peripheral area to reduce the visibility of the peripheral area in light reflected by the electronic device. The second patterns may be disposed spaced apart from the first patterns and may have a second shape defining a second area less than or equal to the first area.

The sensor may include a plurality of mesh lines, and each of the boundary, the first patterns, and the second patterns may be defined by cutting away a portion of the mesh lines.

Each of the center areas may have a quadrangular shape defined by two sides extending in a first direction and two sides extending in a second direction transverse to the first direction.

The peripheral area may have a lattice shape extending in the first direction and the second direction.

The first patterns may be arranged in a matrix form extending in the first direction and the second direction in each of the center areas.

The first patterns and the second patterns may be arranged along the first direction and the second direction, respectively.

Shapes of the second patterns facing each other in the first direction may be rotationally symmetrical with each other.

Shapes of the second patterns facing each other in the second direction may be linearly symmetrical with each other with respect to a straight line extending in the first direction.

Shapes of the second patterns facing each other in the first direction may be linearly symmetrical with each other with respect to a straight line extending in the second direction.

The sensor may include a plurality of third patterns defined in the peripheral area, and at least some of the third patterns may have a third shape corresponding to the portion of the first area greater than the second area.

A first set of third patterns may extend in the second direction, and each the first set of third patterns may connect two second patterns facing each other in the second direction among the second cut-away patterns.

A second set of third patterns may extend in the first direction, and each of the second set of third patterns may connect two second patterns facing each other in the first direction among the second patterns.

Each of the third patterns might not be overlapped with each other in the second direction.

Some of the first set of third patterns may be connected to respective ones of the second set of third patterns and some of first set of third patterns might not be connected to any of the second set of third patterns.

At least a portion of the boundary may be defined by at least a portion of some of the second patterns and by at least a portion of some of the third patterns.

The first and second areas may be substantially equal.

Two second patterns facing each other in the second direction may include a first of the two second patterns connected to one side portion of one third pattern and a second of the two second patterns connected to an opposing side portion of the one third pattern.

A portion of a second pattern may define a portion of the boundary and may be one of the three sides of the first pattern that has the quadrangular shape in the second pattern.

According to yet another aspect of the invention, an electronic device may include a first electrode and a second electrode, each having a central portion and a peripheral portion, a grid of electrically conductive lines in the central portions and the peripheral portions of the first and second electrodes, a boundary region without electrically conductive lines having first and second sides, the peripheral portion of the first electrode being adjacent to the first side of the boundary and the peripheral portion of the second electrode being adjacent to the second side of the boundary, a plurality of first patterns provided in the central portions and having grid lines within the first patterns electrically isolated from the electrically conductive grid lines in the central portions outside of the first patterns, and a plurality of second patterns provided in the peripheral portions, the second patterns having grid lines within the second patterns electrically connected to at least one of the grid lines in the peripheral portions outside of the second patterns.

At least some of the first patterns may define substantially closed loop shapes in the grid lines in the central portions, and at least some of the second patterns may define open or partially open shapes in the grid lines of the peripheral portions.

A distal end of at least some of the second patterns may abut the boundary.

An area of each of the first patterns may be substantially equal to an area of each of the second patterns.

According to the above, in various exemplary embodiments, the extent to which a user can perceive the boundary between the sensor areas in the pattern of the reflected light may be reduced or even eliminated. Likewise, in various exemplary embodiments, the extent to which a user can perceive, in the reflected light, the conductive patterns in the sensor area may be reduced or even eliminated.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
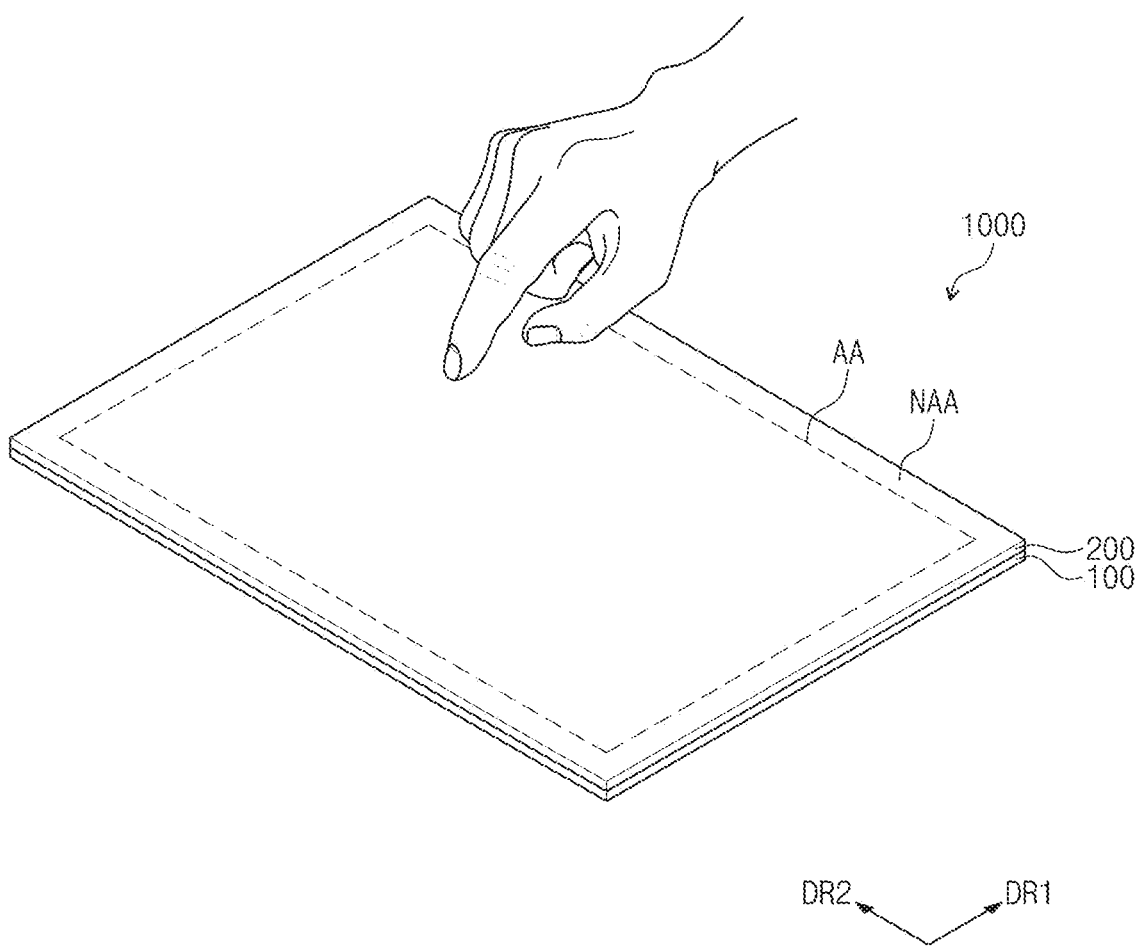
FIG. 1 is a perspective view of an exemplary embodiment of an electronic device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, the electronic device according to an embodiment of the inventive concept will be described in detail with reference to FIGS. 1 and 2.

Referring to FIG. 1, the electronic device 1000 may sense a touch provided from the outside. For instance, the electronic device 1000 may be, but is not limited to, a touch screen or a display device on which a touch event initiated by a user or other input may occur. In various exemplary embodiments, both a touch screen and a display device are provided; and, in some embodiments, a touch screen is disposed on top of a display device that is independently capable of sensing a touch event.

A touch event may be provided in various ways. In FIG. 1, the electronic device 1000 may sense a state in which a human body part, such as a user's hand, approaches to make, or actually makes, contact with the electronic device 1000 as the touch.

However, the invention should not be limited thereto or thereby. That is, in various exemplary embodiments, the electronic device 1000 may sense a state in which an object, such as a stylus pen, approaches to or makes contact with the electronic device 1000 as the touch. In addition, the electronic device 1000 may sense the touch through various other ways, such as an optical sensing scheme, a contact sensing scheme, a thermal sensing scheme, a magnetic sensing scheme, and so on.

The electronic device 1000 may include an active area AA and a peripheral area NAA distinct from the active area AA when viewed in a plan view. The active area AA may be activated in response to an electrical signal applied thereto to sense the touch.

In various exemplary embodiments, the active area AA may be defined relatively adjacent to a center of the electronic device 1000, but, other embodiments can be different. That is, the active area AA may be defined to be located at an outer portion or one side portion of the electronic device 1000 depending on the use of the electronic device 1000.

The peripheral area NAA may be defined adjacent to the active area AA. In various exemplary embodiments, the electronic device 1000 does not sense the touch occurring in the peripheral area NAA.

As shown in FIG. 1, the peripheral area NAA may have a frame shape to surround the active area AA, but in other embodiments, the shape of the peripheral area NAA is different. In addition, an entire front surface of the electronic device 1000 may serve as the active area AA, and in such embodiments, the peripheral area NAA is omitted.

The electronic device 1000 may include a base member 100 and a touch member 200. The base member 100 may be, but is not necessarily, a base layer on which the touch member 200 is disposed.

For instance, the base member 100 may be an insulating substrate or an insulating film including an insulating material, e.g., a glass, a polymer resin, etc. In embodiments where the base member 100 is an insulating substrate, the electronic device 1000 may have improved strength. In embodiments where the base member 100 is an insulating film, the electronic device 1000 may have improved flexibility.

Meanwhile, the base member 100 may be, but is not necessarily, a thin film layer in which a plurality of organic layers and/or a plurality of inorganic layers are stacked. In such embodiments, the electronic device 1000 may be thinner than conventional devices.

Accordingly, the base member 100 according to various exemplary embodiment may have many different configurations.

The touch member 200 may be disposed on one surface of the base member 100. In FIG. 1, the exemplary touch member 200 is disposed on an upper surface of the base member 100, but the touch member 200 may be disposed on a lower surface of the base member 100 in other embodiments.

The touch from the outside is sensed by the touch member 200. As shown in FIG. 2, touch member 200 includes a plurality of first electrodes TE1, a plurality of second electrodes TE2, a plurality of first wirings WP1, a plurality of second wirings WP2, a plurality of first pads PD1, and a plurality of second pads PD2.

The first electrodes TE1 and the second electrodes TE2 are arranged in the active area AA. The first electrodes TE1 and the second electrodes TE2 are insulated from each other while extending across each other transversely.

For instance, the first electrodes TE1 output a sensing signal, and the second electrodes TE2 may receive a driving signal. In such embodiments, the electronic device 1000 applies the driving signal to the second electrodes TE2 to scan the active area AA and senses an area in which the touch occurs on the basis of the sensing signal output from the first electrodes TE1.

Thus, in various exemplary embodiments, the first electrodes TE1 may receive the driving signal, and the second electrodes TE2 may output the sensing signal. In addition, the first and second electrodes TE1 and TE2 may further receive or output other electronic signals.

The first electrodes TE1 extend in a first direction DR1 and are arranged in a second direction DR2 intersecting the first direction DR1.

Each of the first electrodes TE1 includes a plurality of first sensor parts SP1 and a plurality of first connection parts CP1. The first sensor parts SP1 are arranged in the first direction DR1, and the first connection parts CP1 connect the first sensor parts SP1 to each other.

The second electrodes TE2 extend in the second direction DR2 and are arranged in the first direction DR1. Each of the second electrodes TE2 includes a plurality of second sensor parts SP2 and a plurality of second connection parts CP2. The second sensor parts SP2 are arranged in the second direction DR2, and the second connection parts CP2 connect the second sensor parts SP2 to each other.

In various exemplary embodiments, each of the first sensor parts SP1 and the second sensor parts SP2 includes a plurality of mesh lines. Each of the mesh lines extends in a third direction DR3 or a fourth direction DR4. The third and fourth directions DR3 and DR4 intersect each other and respectively intersect the first and second directions DR1 and DR2. Directions DR1 and DR2 may intersect at a 90 degree angle, while directions DR3 and DR4 also intersect each other at a 90 degree, wherein a 45 degree angle is formed between each of DR1 and DR3, DR3 and DR2, and DR2 and DR4.

In the first sensor parts SP1 and the second sensor parts SP2 adjacent to the first sensor parts SP1, the mesh lines of the first sensor parts SP1 are separated from the mesh lines of the second sensor parts SP2. A space separating the first sensor parts SP1 and the second sensor parts SP2 may be referred to as a boundary between the first sensor parts SP1 and the second sensor parts SP2.

The first wirings WP1 and the second wirings WP2 are arranged in the peripheral area NAA. The first wirings WP1 are respectively connected to the first electrodes TE1, and the second wirings WP2 are respectively connected to the second electrodes TE2.

The first pads PD1 and the second pads PD2 are arranged in the peripheral area NAA. The first pads PD1 are respectively connected to the first wirings WP1, and the second pads PD2 are respectively connected to the second wirings WP2.

The electronic device 1000 may receive a power source voltage from an external power source through the first and second pads PD1 and PD2 and output a signal corresponding to the touch occurring and sensed in the active area AA through the first pads PD1 and the second pads PD2.

In various exemplary embodiments, the first pads PD1 and the second pads PD2 are sequentially arranged, but the first pads PD1 may be alternately arranged with or separately arranged from the second pads PD2. However, the arrangement of the first and second pads PD1 and PD2 should not be limited to the depicted embodiments.

The touch member 200 may be operated in the electrostatic capacitive mode that senses the touch through an electrostatic capacitive coupling between the first electrodes TE1 and the second electrodes TE2, but other embodiments are different. That is, the touch member 200 may sense the touch through various modes, e.g., a resistive mode, an optical mode, an ultrasonic wave mode, a coordinate recognition mode, etc., and have an electrode structure corresponding to the above-mentioned modes.

Each of the first sensor parts SP1 and each of the second sensor parts SP2 include a plurality of areas. Each first sensor part SP1 includes a first area AR11 and a second area AR12, and each second sensor part SP2 includes a first area AR21 and a second area AR22.

The first area AR11 of the first sensor part SP1 and the first area AR21 of the second sensor part SP2 are respectively disposed at centers of the first sensor part SP1 and the second sensor part SP2.

The second area AR12 of the first sensor part SP1 and the second area AR22 of the second sensor part SP2 are disposed adjacent to the first area AR11 of the first sensor part SP1 and the first area AR21 of the second sensor part SP2, respectively. The second area AR12 of the first sensor part SP1 and the second area AR22 of the second sensor part SP2 are adjacent to the boundary between the first sensor part SP1 and the second sensor part SP2. The first areas AR11 and aR21 and the second areas AR12 and AR22 will be described in detail later.

Although not shown in figures, the active area AA of the touch member 200 includes a plurality of center areas and a peripheral area. The first area AR11 of the first sensor part SP1 and the first area AR21 of the second sensor part SP2 respectively correspond to the center areas.

The peripheral area is disposed adjacent to the center areas to surround each center area. The second area AR12 of the first sensor part SP1, the second area AR22 of the second sensor part SP2, and the boundary between the first sensor part SP1 and the second sensor part SP2 correspond to the peripheral area. The center areas and the peripheral area will be described in detail later.

Figure 3A:
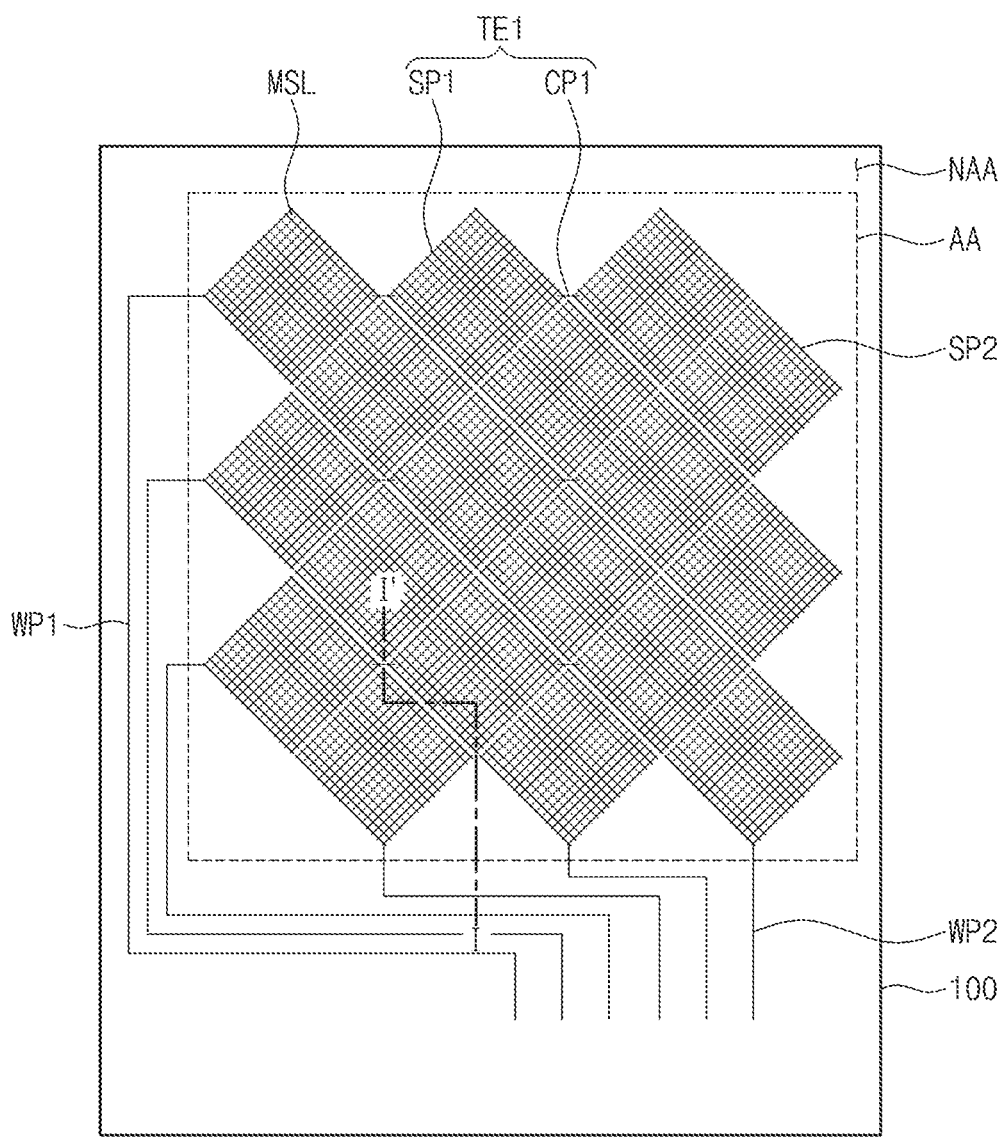
FIGS. 3A and 3B are schematic top plan views showing a portion of the components of an electronic device according to an exemplary embodiment of the invention.
Figure 3B:
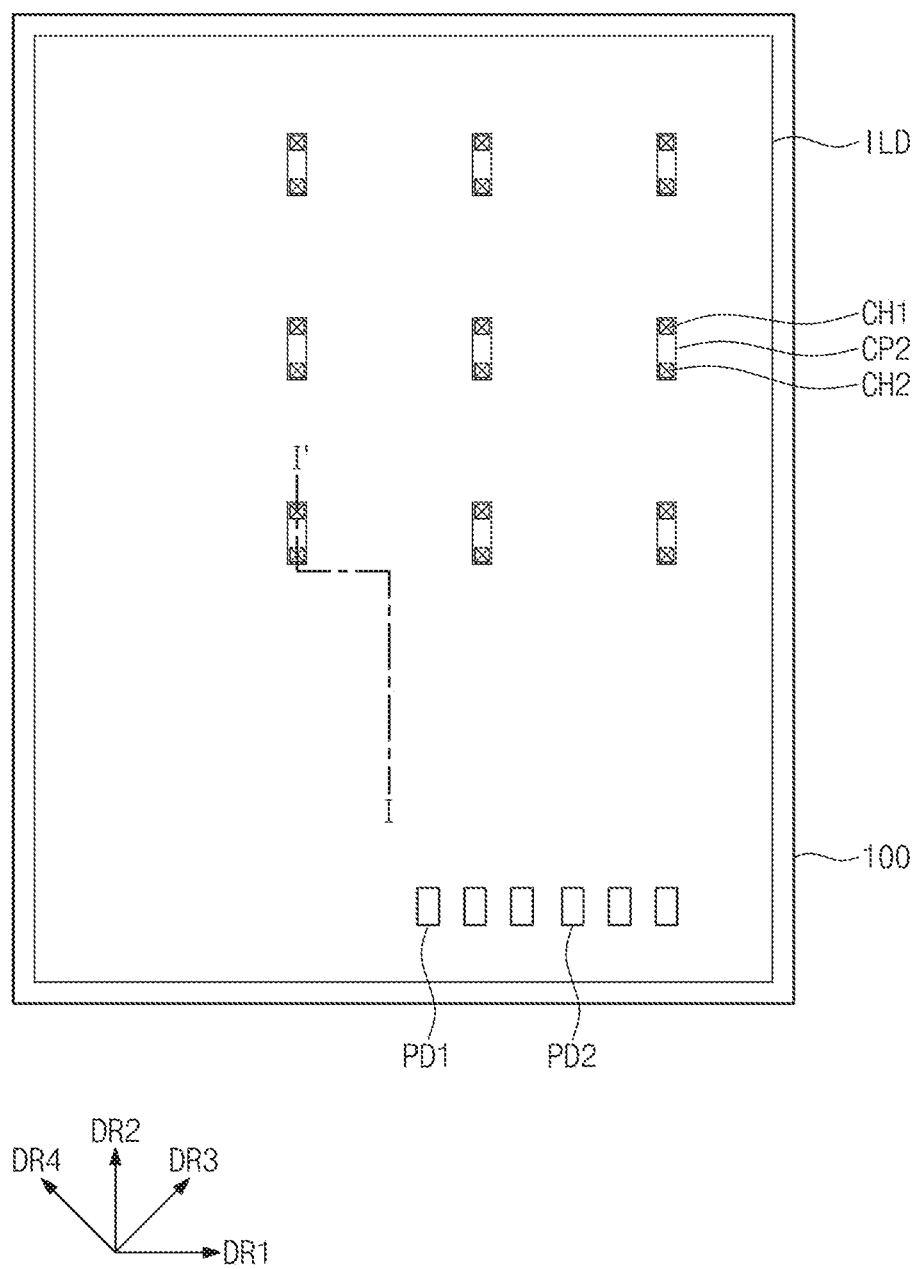

FIG. 3A shows components disposed on the base member 100, and FIG. 3B shows components disposed on an insulating layer ILD. Hereinafter, the electronic device 1000 will be described in detail with reference to FIGS. 3A to 3C.

Referring to the embodiment of FIG. 3A, the first sensor parts SP1, the first connection parts CP1, the second sensor parts SP2, the first wirings WP1, and the second wirings WP2 are disposed on the base member 100.

The first connection parts CP1 are disposed on the base member 100 and disposed on the same layer as the first sensor parts SP1 and the second sensor parts SP2. Accordingly, the first sensor parts SP1, the second sensor parts SP2, and the first connection parts CP1 are formed substantially simultaneously.

In addition, the first sensor parts SP1 may be integrally formed with the first connection parts CP1, but other embodiments are different. That is, the first sensor parts SP1 may be independently formed from the first connection parts CP1.

Figure 3C:
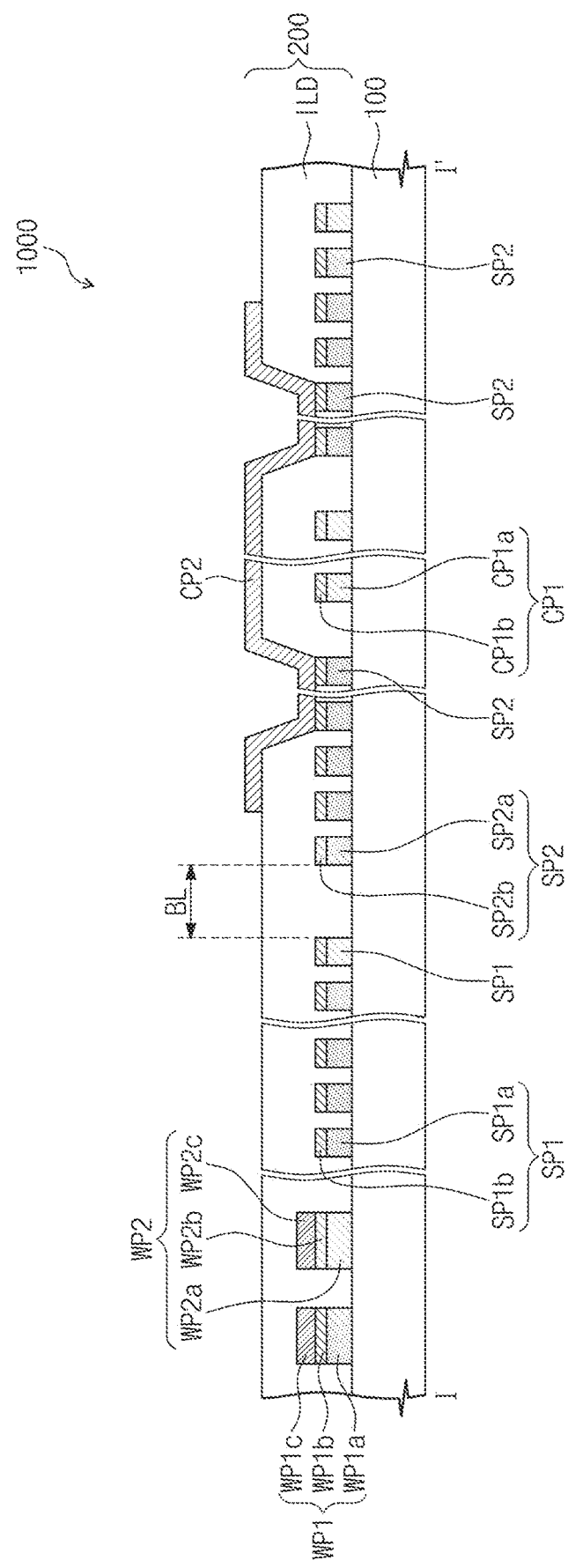
FIG. 3C is a cross-sectional view taken along a line I-I' of FIG. 3B.

Each of the first sensor parts SP1 has a single or multi-layer structure. For instance, as shown in FIG. 3C, each of the first sensor parts SP1 includes a first conductive layer SP1a and a second conductive layer SP1b.

The first conductive layer SP1a includes silver-nanowire (AgNW). The second conductive layer SP1b includes a transparent conductive material, e.g., indium tin oxide (ITO), indium zinc oxide (IZO), etc.

Alternatively, each of the first and second conductive layers SP1a and SP1b may have a single-layer structure of a single material. Each of the first and second conductive layers SP1a and SP1b may include various conductive materials.

Each of the first connection parts CP1 has a single or multi-layer structure. For instance, the first connection parts CP1 may have substantially the same structure as that of the first sensor parts SP1.

In various exemplary embodiments, each of the first connection parts CP1 includes a first conductive layer CP1a and a second conductive layer CP1b disposed on the first conductive layer CP1a. The first conductive layer CP1a and the second conductive layer CP1b respectively correspond to the first conductive layer SP1a and the second conductive layer SP1b of the first sensor parts SP1.

Each of the second sensor parts SP2 has a single or multi-layer structure. In the depicted embodiment, the second sensor parts SP2 has substantially the same structure of the first sensor parts SP1. Each of the second sensor parts SP2 includes a first conductive layer SP2a and a second conductive layer SP2b, which respectively correspond to the first conductive layer SP1a and the second conductive layer SP1b of the first sensor parts SP1.

Meanwhile, one first sensor part SP1 and one second sensor part SP2 disposed adjacent to the one first sensor part SP1 may be disposed spaced apart from each other. In such embodiments, the space between the first sensor part SP1 and the second sensor part SP2 may be referred to as the boundary BL. As depicted, the mesh lines MSL do not exist in the boundary BL. This causes the boundary to be a pattern visible in light reflected by the device 1000.

Although not shown in figures, a dummy pattern may be further disposed between the one first sensor part SP1 and the one second sensor part SP2. The dummy pattern is electrically insulated from the first SP1 and second SP2 sensor parts adjacent thereto. In at least some such embodiments, cut-away portions of the mesh lines MSL define a boundary between the first sensor part and the dummy pattern and a boundary between the second sensor part and the dummy pattern.

The insulating layer ILD may be disposed on the base member 100 to cover the first electrodes TE1 and the second sensor parts SP2. The insulating layer ILD may be overlapped with the entire surface of the active area AA.

The insulating layer ILD includes an insulating material. For instance, the insulating layer ILD includes an organic material and/or an inorganic material. The insulating layer ILD protects the first electrodes TE1 and the second sensor parts SP2.

In the illustrated embodiment, the second connection parts CP2 extend in the second direction DR2. The second connections parts CP2 are disposed on a layer different from a layer on which the first connection parts CP1 are disposed and are insulated from the first electrodes TE1.

The insulating layer ILD includes a plurality of contact holes CH1 and CH2 formed therethrough to overlap with opposite ends of the second connection portions CP2. The second connection portions CP2 connect the second sensor parts adjacent to each other through the contact holes CH1 and CH2. A portion of the mesh lines forming the second sensor parts SP2 may be connected to the second connection parts CP2 to be electrically connected to the adjacent second sensor part.

The second connection parts CP2 may include a conductive material. For instance, the second connection parts CP2 may include a transparent conductive material. Meanwhile, the second connection parts CP2 may have substantially the same structure as the first connection parts CP1.

In various exemplary embodiments, each of the first connection parts CP1 and the second connection parts CP2 includes a pattern shape having an area overlapped with the mesh lines MSL, but other embodiments are different. That is, at least one of the first connection parts CP1 and the second connection parts CP2 may include the mesh lines. The first connection parts CP1 and the second connection parts CP2 may have various structures.

Each of the first wirings WP1 has a single or multi-layer structure. For instance, each of the first wirings WP1 may include a first conductive layer WP1a, a second conductive layer WP1b, and a third conductive layer WP1c.

The second conductive layer WP1b is disposed on the first conductive layer WP1a. Also in the illustrated embodiment, the first and second conductive layers WP1a and WP1b of each of the first wirings WP1 respectively correspond to the first and second conductive layers SP1a and SP1b of the first sensor parts SP1.

For instance, the first conductive layer WP1a may include silver-nanowire (AgNW), and the second conductive layer WP1b may include a transparent conductive oxide.

The third conductive layer WP1c may be disposed on the second conductive layer WP1b. The third conductive layer WP1c may have a relatively higher conductance than the first and second conductive layers WP1a and WP1b.

The third conductive layer WP1c includes a metallic material. The first wirings WP1 include more third conductive layer WP1c than the first electrodes TE1 do, and thus the first wirings WP1 have a relatively higher electrical conductivity.

Each of the second wirings WP2 has a single or multi-layer structure. The second wirings WP2 have substantially the same structure as the first wirings WP1.

For instance, each of the second wirings WP2 may include a first conductive layer WP2a, a second conductive layer WP2b, and a third conductive layer WP2c, which respectively correspond to the first conductive layer WP1a, the second conductive layer WP1b, and the third conductive layer WP1c. In this case, the first wirings WP1 and the second wirings WP2 may be formed substantially simultaneously through the same patterning process, and thus a process time may be shortened.

However, according to other embodiments, the first and second wirings WP1 and WP2 may have different structures and include different materials.

In various exemplary embodiments, the first pads PD1 and the second pads PD2 are disposed on the insulating layer ILD. The first pads PD1 and the second pads PD2 are disposed on the same layer as the second connection parts CP2. The first pads PD1 are respectively connected to the first wirings WP1 through the contact holes (not shown) defined through the insulating layer ILD, and the second pads PD2 are respectively connected to the second wirings WP2 through the contact holes (not shown) defined through the insulating layer ILD.

Although not shown in figures, the first pads PD1 and the second pads PD2 may be disposed on the base member 100 and respectively directly connected to the first lines WP1 and the second lines WP2. Thus, the insulating layer ILD may partially cover the base member 100 to expose the first pads PD1 and the second pads PD2.

The touch member of the electronic device according to the present exemplary embodiment may have various shapes without being limited to any particular shape.

Figure 4A:
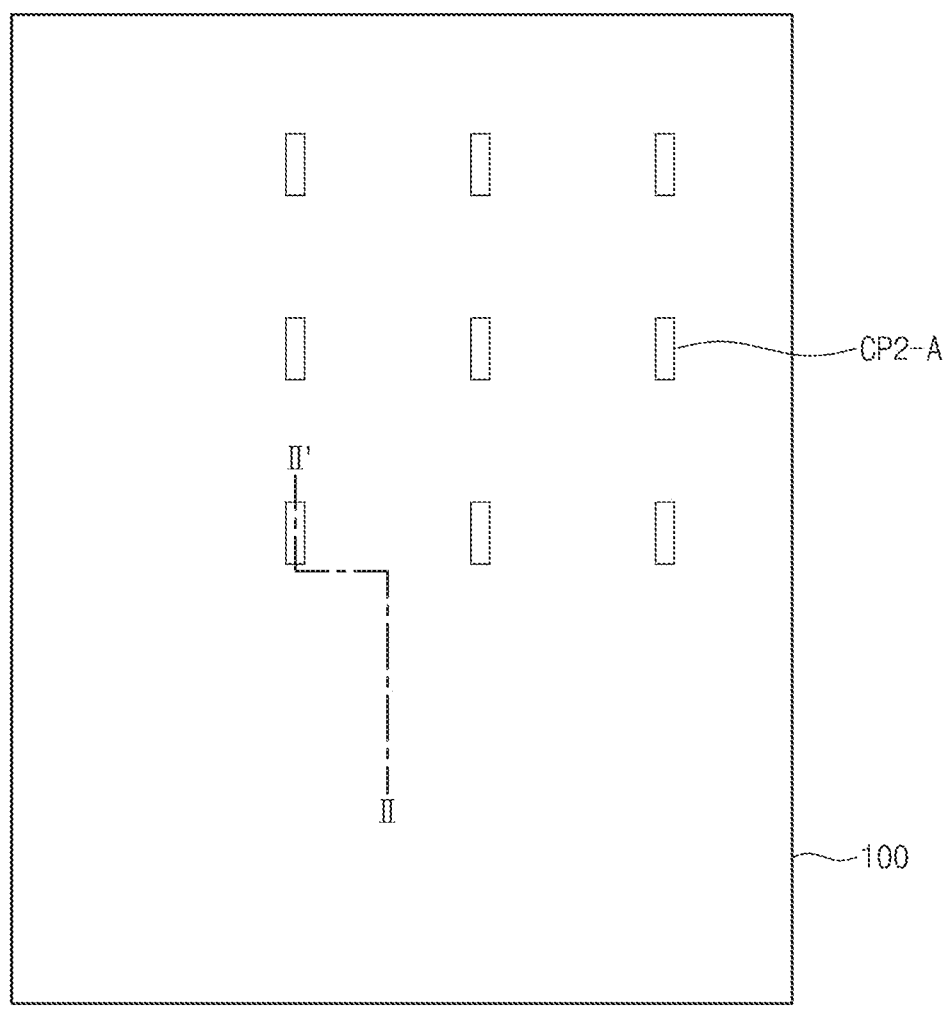
FIGS. 4A to 4C are schematic top plan views showing a portion of the components of an electronic device according to an exemplary embodiment of the invention.
Figure 4B:
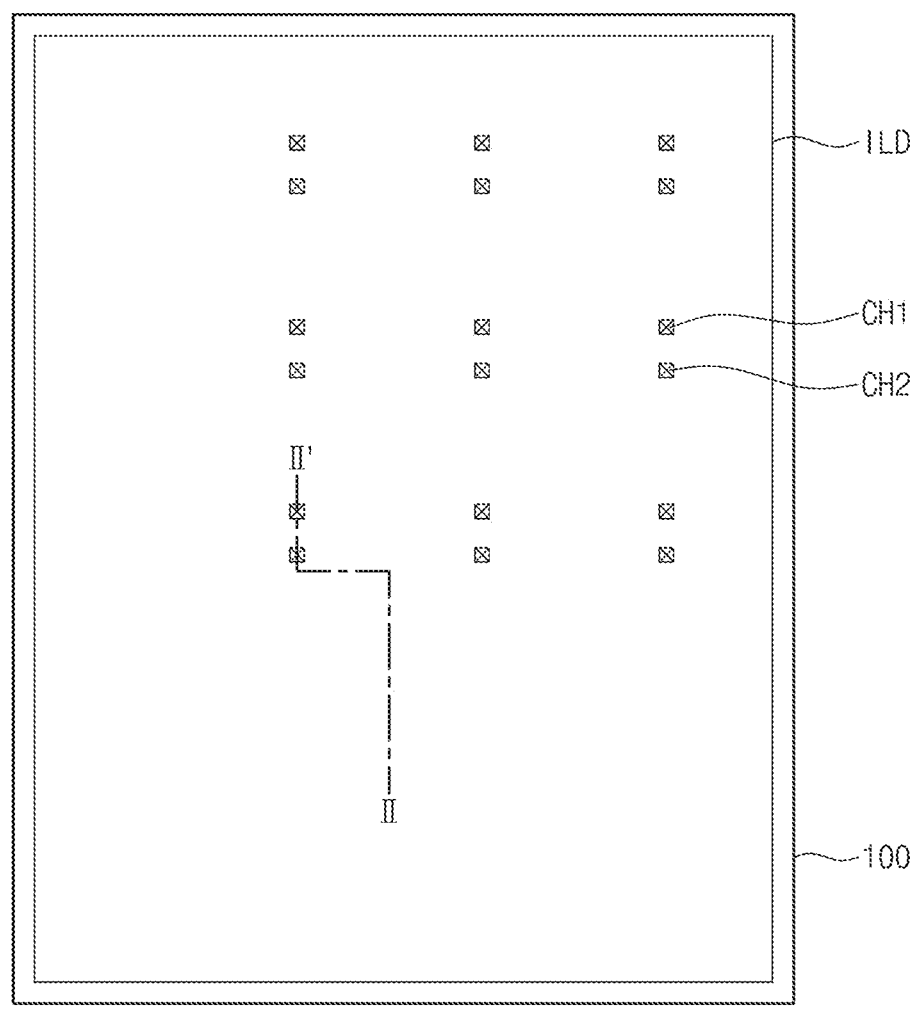
Figure 4C:
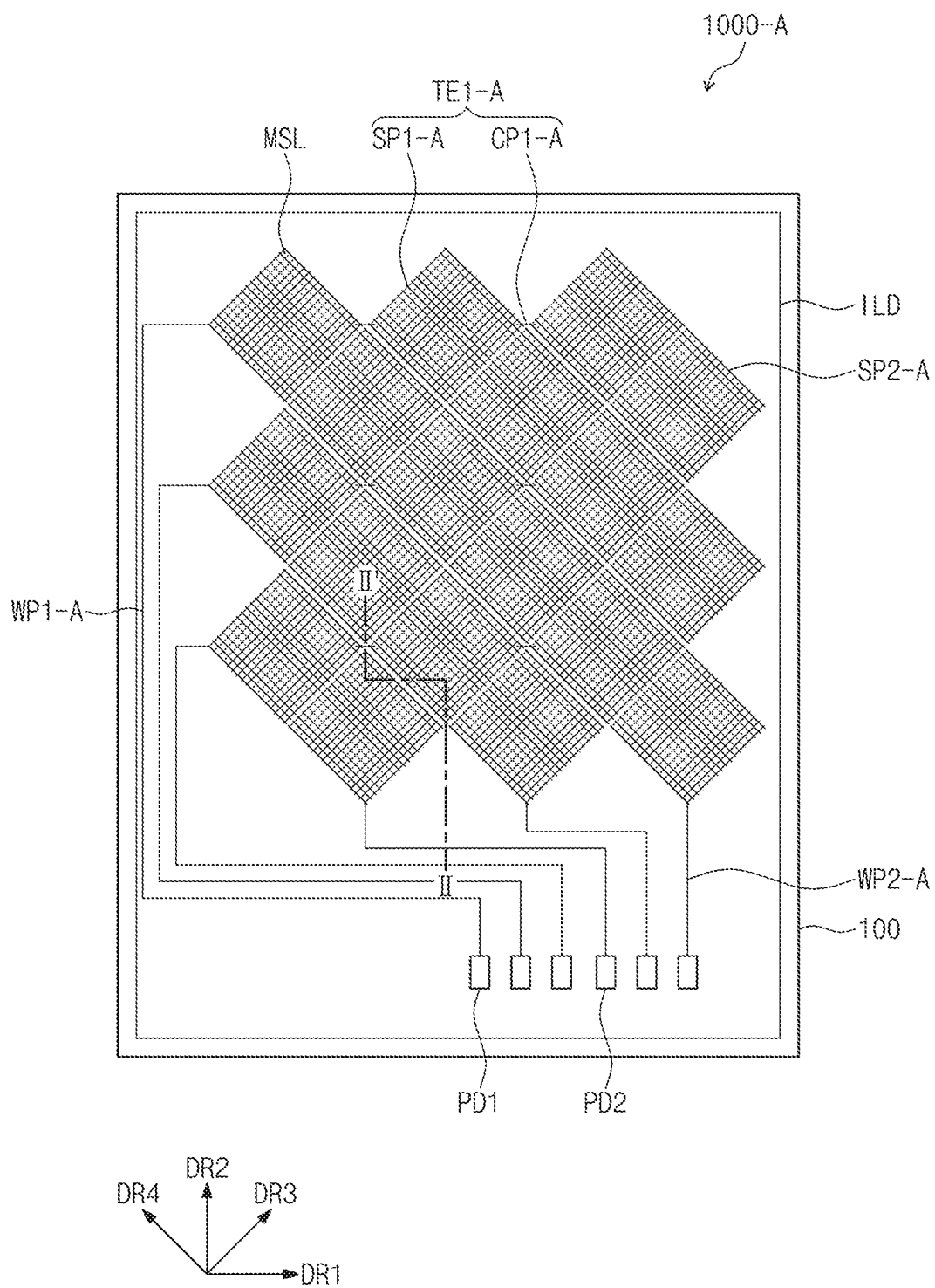

FIGS. 4A to 4C show some components of an electronic device 1000-A constructed according to another exemplary embodiment of the invention. Hereinafter, the electronic device 1000-A will be described in detail with reference to FIGS. 4A to 4C. In FIGS. 4A to 4C, the same reference numerals denote the same elements in FIGS. 3A to 3C, and thus detailed descriptions of the same elements are unnecessary.

Referring to FIGS. 4A and 4B, a plurality of second connection parts CP2-A is disposed on the base member 100. Accordingly, the second connection parts CP2-A are covered by the insulating layer ILD.

The insulating layer ILD includes a plurality of contact holes CH1 and CH2 corresponding to the second connection parts CP2-A. This structure of the insulating layer ILD corresponds to the structure of the insulating layer ILD shown in FIG. 3B.

Referring to FIG. 4C, a plurality of first sensor parts SP1-A, a plurality of first connection parts CP1-A, a plurality of second sensor parts SP2-1, a plurality of first wirings WP1-A, and a plurality of second wirings WP2-A are disposed on the insulating layer ILD. Thus, the second sensor parts SP2-A are respectively connected to the second connection parts CP2-A disposed under the insulating layer ILD through the contact holes CH1 and CH2.

Figure 4D:
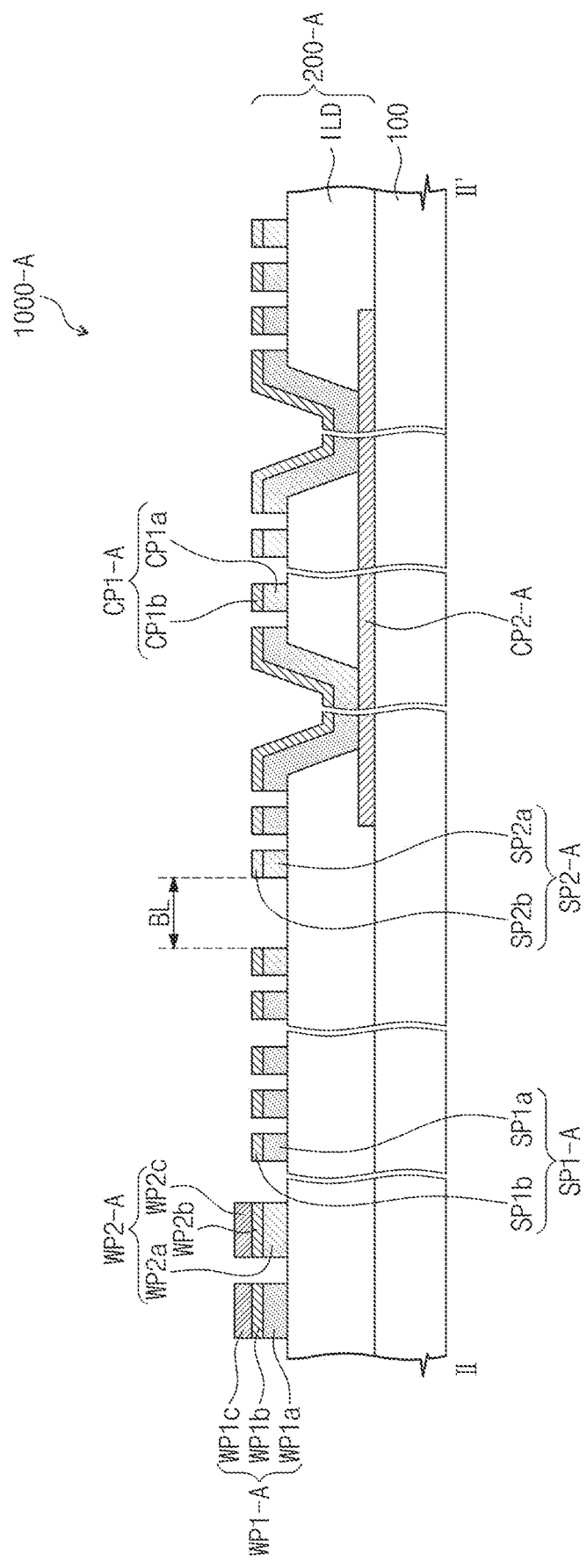
FIG. 4D is a cross-sectional view taken along a line II-II' of FIG. 4C.

Referring to FIG. 4D, a touch member 200-A may have sensor parts and connection parts disposed under the sensing parts and electrically connecting the sensing parts. Accordingly, a plurality of mesh lines MSL of the sensor parts may be disposed on the insulating layer ILD. Thus, a portion of the second sensor parts SP2-A, which is connected to the second connection parts CP2-A, may have a bulk structure, not the mesh structure.

Meanwhile the first sensor parts SP1-A, the first connection parts CP1-A, and the second sensor parts SP2-A may have the bulk structure, not the mesh structure. The electronic device 1000-A may differ in other embodiments.

Figure 5:
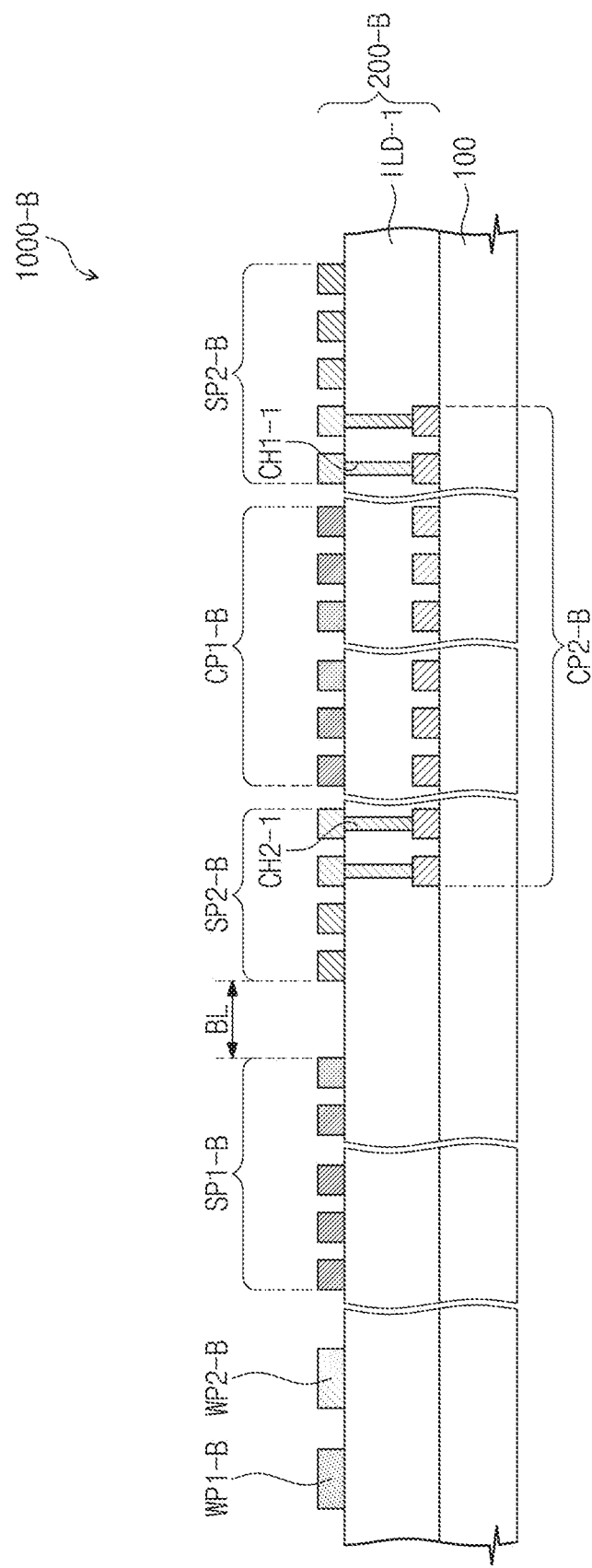
FIG. 5 is a cross-sectional view showing a portion of an electronic device according to another exemplary embodiment of the invention.

The electronic device 1000-B shown in FIG. 5 has substantially the same structure as that of the electronic device 1000-A shown in FIG. 4D except for a second connection part CP2-B. Hereinafter, in FIG. 5, the same reference numerals denote the same elements in FIG. 4D, and thus detailed descriptions of the same elements are unnecessary.

Referring to FIG. 5, each of first sensor parts SP1-B, second sensor parts SP2-B, a first connection part CP1-B, and a second connection part CP2-B of a touch member 200-B includes a plurality of mesh lines.

When compared with FIGS. 4A to 4D, the second connection part CP2-B has a mesh structure configured to include a plurality of mesh lines. In this case, an insulating layer ILD-1 includes a plurality of contact holes CH1-1 and CH2-1 defined therethrough. The contact holes CH-1 and CH2-1 include a plurality of first contact holes CH1-1 and a plurality of second contact holes CH2-1.

Some mesh lines of the second sensor part SP2-B are respectively connected to some mesh lines of the second connection parts CP2-B through the contact holes defined through the insulating layer ILD-1. One side portion of one second connection part CP2-B is connected to one second sensor part SP2-B through the first contact holes CH1-1, and the other side portion of the one second connection part CP2-B is connected to the other second sensor part SP2-B through the second contact holes CH1-2.

The electronic device 1000-B according to various exemplary embodiments includes the second connection part CP2-B having the mesh structure, and thus the second connection part CP2-B may include an opaque material, and the flexibility of the touch member 200-B may be improved. The electronic device 1000-B according to various exemplary embodiments may have various other structures without being limited to the embodiment shown.

Figure 6A:
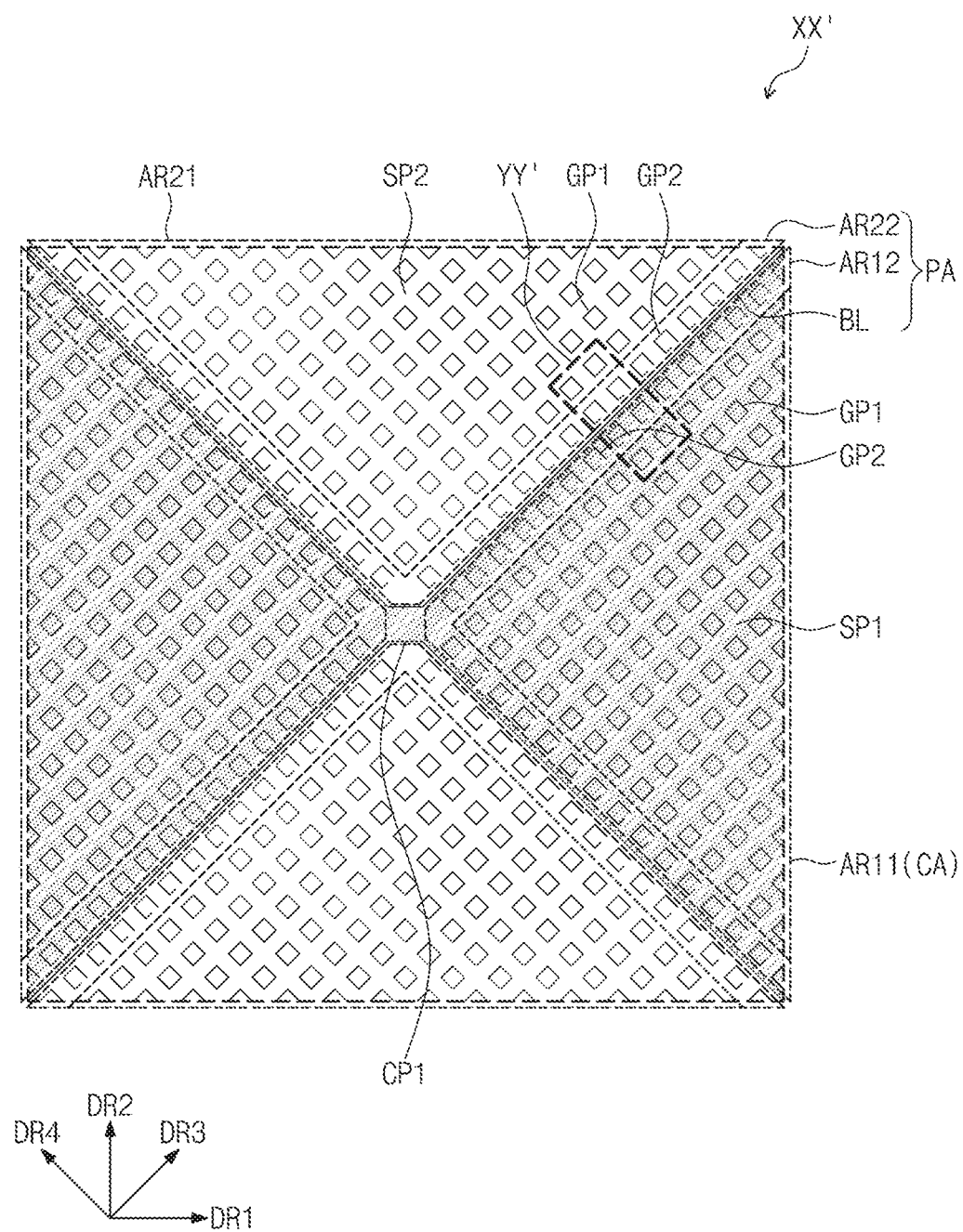
FIG. 6A is an enlarged partial top plan view showing a first exemplary embodiment of area XX' of FIG. 2.

FIG. 6A shows one first connection part CP1, one second connection part CP2 crossing the one first connection part CP1, first sensor parts SP1 adjacent to the first connection part CP1, and second sensor parts SP2 adjacent to the second connection part CP2.

Figure 6B:
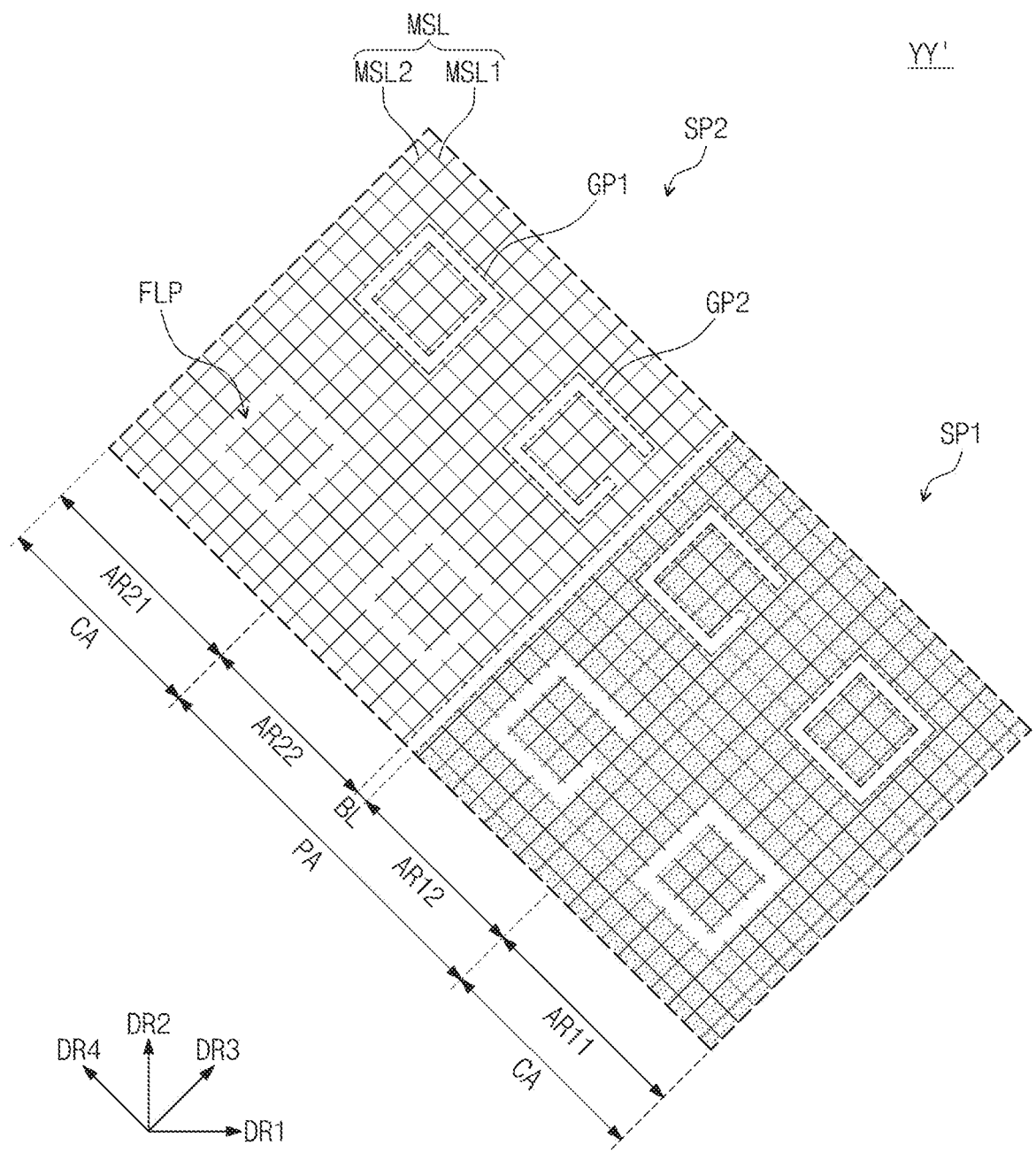
FIG. 6B is an enlarged partial top plan view showing area YY' of FIG. 6A.

In FIG. 6A, the mesh lines are omitted, and opened areas are represented by a solid line. This manner of representing the structure of the various embodiments depicted is carried forward in other Figures as well. In addition, for ease of distinction, the first sensor parts SP1 and the first connection parts CP1 included in the first electrodes TE1 of FIGS. 6A and 6B are depicted as being shaded.

Hereinafter, for the convenience of explanation, one first sensor part SP1 and one second sensor part SP2 will be described in detail. In FIGS. 6A and 6B, the same reference numerals denote the same elements in FIGS. 1 to 5, and thus detailed descriptions of the same elements are unnecessary.

Each of the first sensor part SP1 and the second sensor part SP2 includes a plurality of mesh lines MSL. Each of the mesh lines MSL includes a plurality of first mesh lines MSL1 arranged in the third direction DR3 and extending in the fourth direction DR4 and a plurality of second mesh lines MSL2 arranged in the fourth direction DR4 and extending in the third direction DR3.

In the depicted embodiments, the mesh lines MSL are partially cut away. The partially cut-away portions define void spaces in the touch member 200 (refer to FIG. 1).

The void spaces define patterns or boundaries described later. Accordingly, the patterns or the boundaries have shapes corresponding to shapes of corresponding void spaces when viewed in a plan view. While the exemplary embodiments detailed below describe these patterns as being "cut-away patterns" because they are defined by removing material from selected areas of the device, these patterns can be formed by other means known in the art, such as forming raised surfaces or forming the patterns from a different material.

Meanwhile, each of the first and second sensor parts SP1 and SP2 may be conductive patterns having a bulk structure. In this case, the void spaces may be openings defined through at least a portion of a conductive pattern that is integrally formed as a single unit.

The touch member 200 may be divided into various areas in accordance with the arrangement of the void spaces. For instance, the touch member 200 may include a plurality of center areas and a peripheral area PA. One center area CA is surrounded by the peripheral area PA.

The center areas are disposed at centers of the sensor parts SP1 and SP2, respectively. The center areas are arranged in a matrix form along the third and fourth directions DR3 and DR4.

A plurality of first cut-away patterns GP1 are located at the center of center area CA. The first cut-away patterns GP1 are arranged spaced apart from each other in one center area CA. The center area CA corresponds to the first area AR11 of the first sensor part SP1 or the first area AR21 of the second sensor part SP2.

The peripheral area PA is disposed adjacent to the center areas. The peripheral area PA has a lattice shape extending in the third direction DR3 and the fourth direction DR4. The second area AR12 of the first sensor part, the second area AR22 of the second sensor part, and the boundary BL are defined in the peripheral area PA.

The first sensor part SP1 and the second sensor part SP2 are spaced apart from each other such that the boundary BL is disposed between the first and second sensor parts SP1 and SP2. Due to the boundary BL, the first sensor part SP1 and the second sensor part SP2 are electrically insulated from each other.

In various exemplary embodiments, the boundary BL may have a straight line shape extending along the third direction DR3 or the fourth direction DR4. FIG. 6B shows a portion of the boundary BL which extends along the third direction DR3. The portion of the boundary BL, which extends along the third direction DR3, is defined by cutting away a portion of each of some mesh lines among the first mesh lines MSL1.

Meanwhile, a portion of the boundary BL, which extends along the fourth direction DR4, is defined by cutting away a portion of each of some mesh lines among the second mesh lines MSL2. The boundary BL according to various other exemplary embodiments may have various shapes without being limited to a specific shape.

Each of the first areas AR11 and AR21 of the first and second sensor parts has a quadrangular shape defined by a plurality of sides extending in the third and fourth directions DR3 and DR4. The plurality of first cut-away patterns GP1 are arranged spaced apart from each other in each of the first areas AR11 and AR21 of the first and second sensor parts and arranged in a matrix form extending in the third and fourth directions DR3 and DR4.

Each of the first cut-away patterns GP1 has a closed-loop shape. One first cut-away pattern GP1 electrically insulates the mesh lines MSL in the first cut-away pattern from the mesh lines disposed outside the first cut-away pattern.

In various exemplary embodiments, each of the first sensor part SP1 and the second sensor part SP2 includes a plurality of floating patterns FLP and a peripheral part. The first cut-away patterns GP1 define shapes of the floating patterns FLP, respectively.

The mesh lines in one first cut-away pattern correspond to one floating pattern. In various exemplary embodiments, each of the first cut-away patterns GP1 has a quadrangular frame shape, but the shape of the first cut-away patterns GP1 should not be limited to the quadrangular frame shape. That is, each of the first cut-away patterns GP1 may have a circular shape, an oval shape, or a polygonal shape, or some other regular geometric or irregular shape.

The first cut-away patterns GP1 isolates the floating patterns FLP from the peripheral portion. The mesh lines disposed inside each of the first cut-away patterns GP1 define the floating patterns and are electrically connected to each other, and the mesh lines disposed outside each of the first cut-away patterns GP1 define the peripheral portion and are electrically connected to each other.

Each of the first sensor part SP1 and the second sensor part SP2 senses the touch provided from the outside through the peripheral portion. The floating patterns FLP are electrically separated from the peripheral portion, and thus the floating patterns FLP are less affected by electrical signals respectively applied to the first and second sensor parts SP1 and SP2.

Accordingly, defects, which are generated due to electrical interaction between the floating patterns FLP and electrodes disposed under the first and second sensor parts SP1 and SP2, may be reduced or prevented. In detail, noises, which are generated due to the electrical interaction between an electrical signal applied to the first and second sensor parts SP1 and SP2 and an electrical signal applied to the pixel electrode disposed under the first and second sensor parts SP1 and SP2, may be reduced or prevented.

The second areas AR12 and AR22 of the first and second sensor parts are disposed respectively adjacent to the first areas AR11 and AR21 of the first and second sensor parts. The second areas AR12 and AR22 of the first and second sensor parts respectively surround the first areas AR11 and AR21 of the first and second sensor parts.

In various exemplary embodiments, the second areas AR12 and AR22 of the first and second sensor parts respectively surround the quadrangular shape of the first areas AR11 and AR21 of the first and second sensor parts. For instance, each of the second areas AR12 and AR22 of the first and second sensor has the quadrangular frame shape. In this case, each of the second areas AR12 and AR22 of the first and second sensor surrounds all or a portion of a corresponding area of the first areas AR11 and AR21 of the first and second sensor parts. According to other embodiments, the second areas AR12 and AR22 of the first and second sensor parts may have various shapes wherein the second areas AR12 and AR22 of the first and second sensor parts are disposed respectively adjacent to the first areas AR11 and AR21 of the first and second sensor parts.

The second area AR12 of the first sensor part and the second area AR22 of the second sensor part are disposed adjacent to the boundary BL. The second area AR12 of the first sensor part and the second area AR22 of the second sensor part face each other such that the boundary BL is disposed between the second area AR12 of the first sensor part and the second area AR22 of the second sensor part.

Each of the second areas AR12 and AR22 of the first and second sensor parts includes a plurality of second cut-away patterns GP2 defined therein. The second cut-away patterns GP2 are arranged spaced apart from each other in each of the second areas AR12 and AR22 of the first and second sensor parts. The second cut-away patterns GP2 are spaced apart from the first cut-away patterns GP1.

Each of the second cut-away patterns GP2 has a shape obtained by not cutting away a portion of a closed-loop shape. For instance, each of the second cut-away patterns GP2 has a shape corresponding to a shape that results by not removing all portions of the material removed to form the closed-loop shape of the first cut-away patterns GP1. A shape formed by not removing all portions of the material removed to form a closed-loop shape, such as the shape of cut-away patterns GP2 for example, is referred to herein as a partially closed shape.

In detail, each of the second cut-away patterns GP2 may have a partially cut-away circular shape, a partially cut-away quadrangular shape, a partially cut-away polygonal shape, a partially cut-away oval shape or some other shape formed by partially cutting-away a section of looped structure. In various exemplary embodiments, each of the second cut-away patterns GP2 may have a partially cut-away quadrangular shape as depicted.

Meanwhile, as will be discussed in greater detail below, each of the second cut-away patterns GP2 may be arranged in various ways. Each of the second cut-away patterns GP2 may be arranged to have the same shape as or a symmetrical shape to that of an adjacent second cut-away pattern thereto. As used herein, a symmetrical shape is a shape that corresponds to another shape if the other shape is rotated over an axis of symmetry. The nature of this symmetry is defined by an axis around which a shape is rotated in order to arrive at a symmetrical shape in question. In some embodiments each of the second cut-away patterns has the same shape and the same orientation. In other embodiments, each of the second cut-away patterns has the same shape, but the orientation of that same shape changes from one of the second cut-away patterns to another. In more complicated embodiments one of the second cut-away patterns may have the same shape as another of the second cut-away patterns with that shape being both symmetrical and rotated.

Accordingly, in various exemplary embodiments, the second cut-away patterns GP2 have the same shape and are arranged in the same direction. For instance, as shown in FIG. 6B, a cut-away side portion of one second cut-away pattern GP2 defined in the second area AR22 of the second sensor part SP2 is disposed toward the boundary BL.

In this case, one second cut-away pattern GP2 defined in the second area AR12 of the first sensor part has the same shape and the same orientation as that of the second cut-away pattern GP2 defined in the second area AR22 of the second sensor part.

However, each of the second cut-away patterns GP2 may have various other shapes in other embodiments and may be arranged in various other orientations as will be discussed in greater detail below.

In various exemplary embodiments, differing from the depicted quadrangular first cut-away patterns GP1, the second cut-away patterns GP2 might not form the floating pattern. Among the mesh lines MSL, the mesh lines disposed in each of the second areas AR12 and AR22 of the first and second sensor parts are electrically connected to each other. In contrast, the floating patterns FLP are electrically separated by the first cut-away patterns GP1 and are arranged in the first areas AR11 and AR21 of the first and second sensor parts as described above.

Referring to FIG. 6A, since the electronic device according to the depicted exemplary embodiment includes the second cut-away patterns GP2, patterns corresponding to the first cut-away patterns GP1 may seem, from a distance, to be consecutively arranged in the second areas AR12 and AR22 of the first and second sensor parts corresponding to peripheral parts of the first areas AR11 and AR21 of the first and second sensor parts. Thus, as a result, less of a differentiated pattern is visible in external light reflected from the boundary and non-boundary areas of device 1000.

A difference in the appearance of a reflection exists between the reflection of external light incident to the electronic device and reflected by the mesh lines MSL and the reflection of external light reflected by the first and second cut-away patterns GP1 and GP2 corresponding to the void spaces. The electronic device 1000 according to this exemplary embodiment includes the second cut-away patterns GP2 similar to the first cut-away patterns GP1 and defined in the second area AR12 and AR22 in which the first cut-away patterns GP1 are not arranged, and thus a visual difference between the first areas AR11 and AR21 and the second areas AR12 and AR22 in reflected light is reduced as compared to the visual difference between the first areas AR11 and AR21 and the second areas AR12 and AR22 in reflected light when the second areas AR12 and AR22 are not provided with the second cut-away patterns GP2.

Meanwhile, each of the first and second sensor parts SP1 and SP2 may be the conductive pattern having the bulk structure. In such cases, the first and second cut-away patterns GP1 and GP2 and the boundary BL may be openings defined through at least the portion of the conductive pattern that is integrally formed in a single unit. The electronic device according to other embodiments may be different.

Figure 7A:
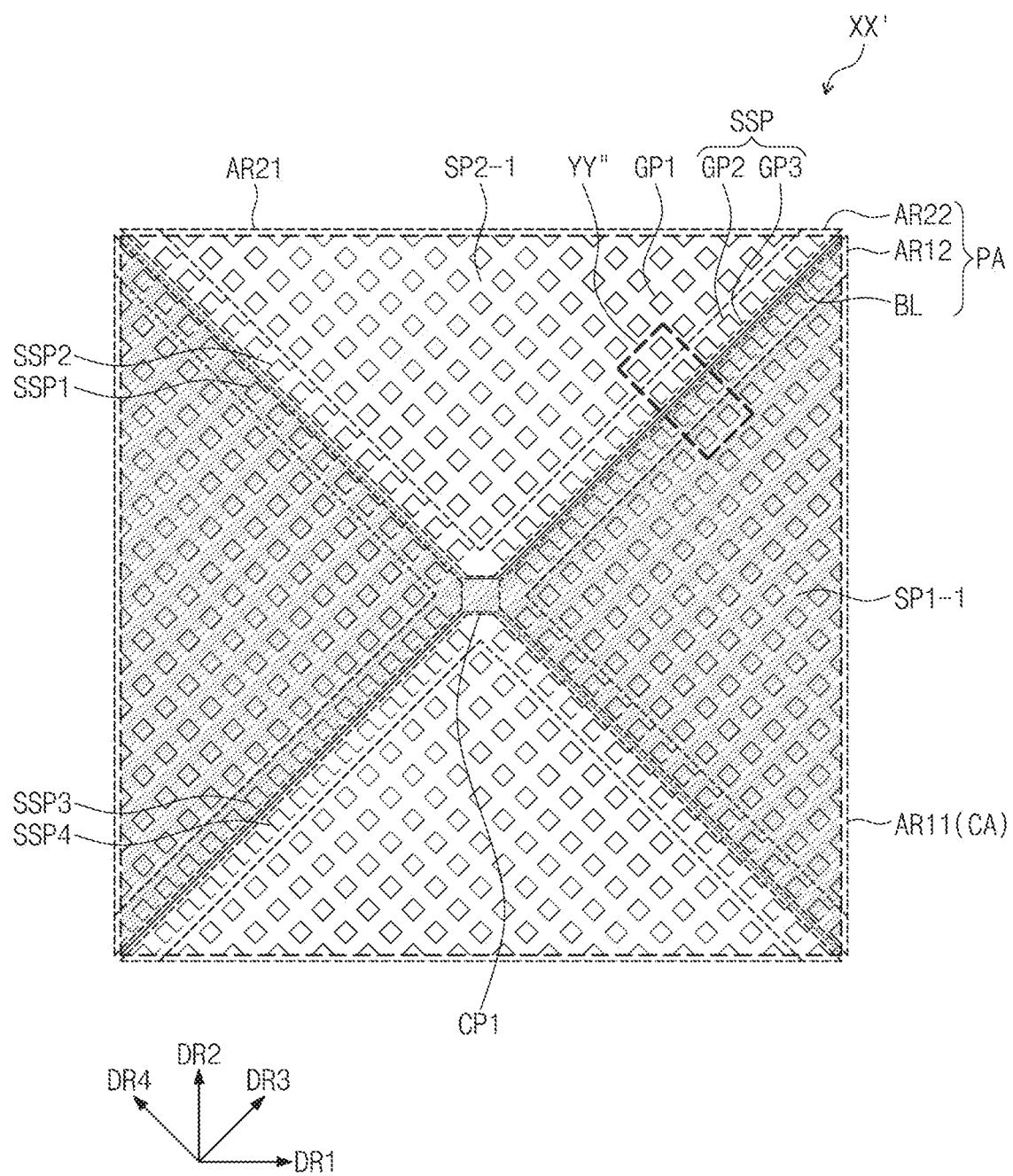
FIG. 7A is an enlarged partial top plan view showing a second exemplary embodiment of area XX' of FIG. 2.
Figure 7B:
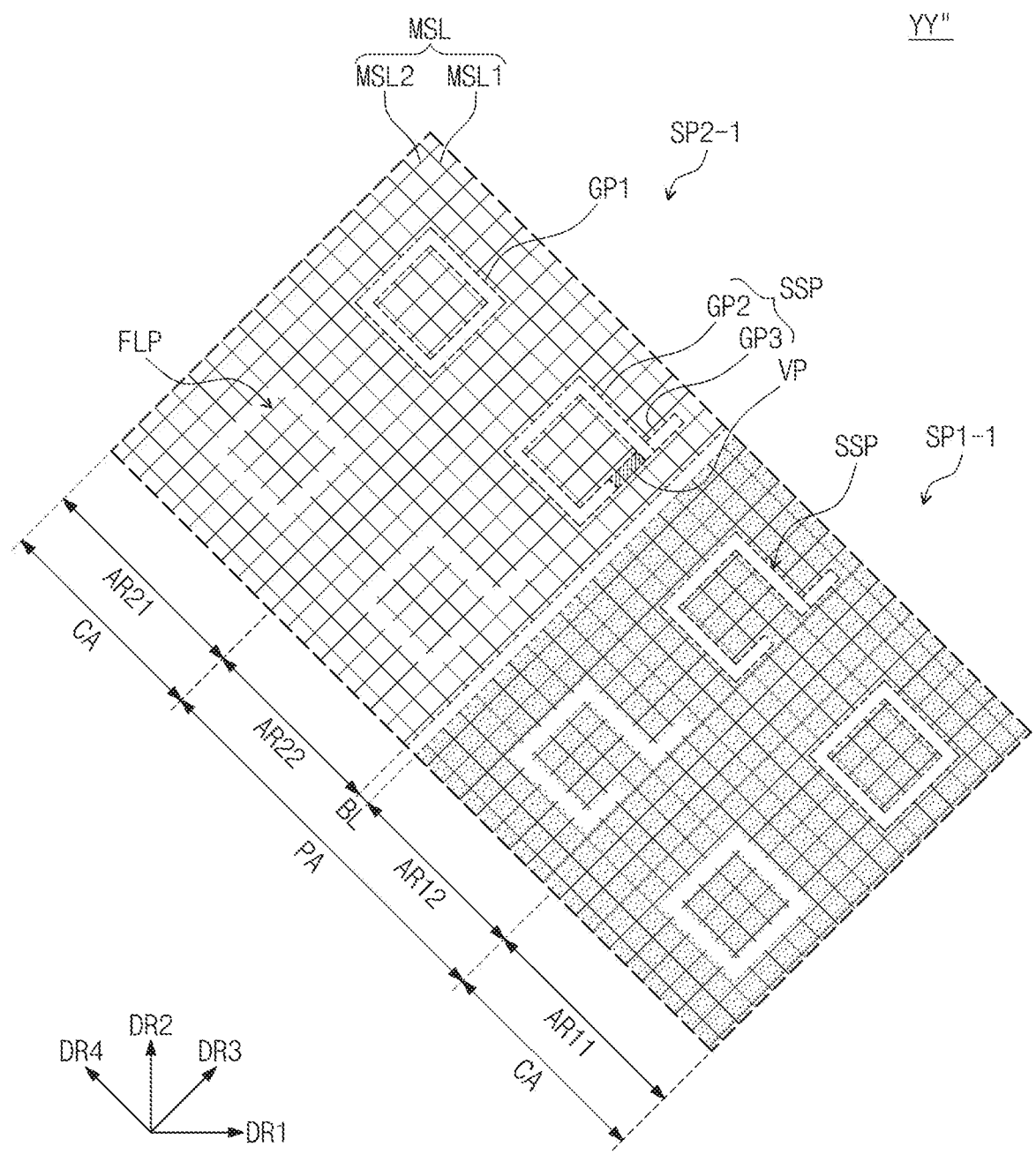
FIG. 7B is an enlarged partial top plan view showing area YY'' of FIG. 7A.

In FIG. 7A, the mesh lines are omitted, and opened areas are represented by a solid line. FIG. 7A shows a different embodiment of an area corresponding to the embodiment of the area shown in FIG. 6A. In addition, for ease of distinction from the second sensor parts SP2-1, the first sensor parts SP1-1 and the first connection parts CP1 are shaded in FIGS. 7A and 7B. In FIGS. 7A and 7B, the same reference numerals denote the same elements in FIGS. 1 to 6B, and thus detailed descriptions of the same elements are unnecessary.

Referring to FIGS. 7A and 7B, each of the first sensor part SP1-1 and the second sensor part SP2-1 further includes a plurality of third cut-away patterns GP3. The third cut-away patterns GP3 are defined in a peripheral are PA. In detail, the third cut-away patterns GP3 are defined in each of the second areas AR12 and AR22.

The third cut-away patterns GP3 are spaced apart from the first cut-away patterns GP1. Each of the third cut-away patterns GP3 has a shape that corresponds to the portion of the first cut-away patterns GP1 not cut-away (shown as VP in FIG. 7B) when forming the second cut-away patterns GP2. Thus, an area of one second cut-away pattern GP2 plus the area of one third cut-away pattern GP3 is the same as an area or size of one first cut-away pattern GP1. However, as discussed in more detail below, the third cut-away pattern GP3 extends outwardly from the partially closed, loop shape formed by GP2 instead of inwardly to define the closed shape of GP1. Having the area of GP2, plus GP3 equal the area of GP1 further reduces the extent to which pattern differences are visible between center area CA and peripheral area PA in external light reflected by the device 1000.

The third cut-away patterns GP3 are respectively connected to the second cut-away patterns GP2 to define space patterns SSP. In the embodiment depicted in FIG. 7A and FIG. 7B, the third cut-away patterns GP3 are respectively connected to the second cut-away patterns GP2 such that the third cut-away patterns GP3 extend away from the second cut-away patterns. In various exemplary embodiments, the space patterns SSP are arranged to have the same shape and same orientation as each other such that any one space pattern SSP could be lifted and moved and placed down upon any other space pattern SSP so at to be identical in size, shape and orientation.

Accordingly, in the embodiment of FIG. 7A, one row of the space patterns SSP is connected to the boundary BL. In particular, in the depicted embodiment, a distal end of the space patterns SSP1 is connected to the boundary BL and the row of space patterns SSP1 connected to the boundary BL extends along direction DR4 on both sides of the connection part CP1. Thus, some space patterns SSP arranged in the fourth direction DR4 among the space patterns SSP arranged in the second area AR12 of the first sensor part SP1-1 and some space patterns SSP arranged in the second area AR22 of the second sensor part SP2-1 are connected to the boundary BL.

As shown in FIG. 7A, although the space pattern SSP having the same shape is provided in a plural number, some space patterns SSP1 are connected to the boundary BL, and some space patterns SSP2, SSP3, SSP4 are spaced apart from the boundary BL according to the depicted arrangement positions of the space patterns SSP1, SSP2, SSP3 and SSP4. In addition, space patterns SSP3 are arranged to allow the third cut-away portion GP3 to be disposed adjacent to the boundary BL, and space patterns SSP2, SSP4 are arranged such that the third cut-away portions GP3 thereof are on the far side of their respective cut-away portions GP2 opposite the boundary BL.

Referring to FIG. 7B, the third cut-away patterns GP3 compensate for the void spaces defined by the second cut-away patterns GP2 as described above. A sum of the void spaces defined by one space pattern SSP may be substantially the same the void space defined by one first cut-away pattern among the first cut-away patterns GP1.

FIG. 7B shows the absent portion VP of the second cut-away pattern GP2 shaded in for comparison with the depicted first cut-away patterns GP1. The absent portion VP may have substantially the same area as and substantially the same shape as that of one of the third cut-away patterns GP3.

The absent portion VP is placed on a cut-away pattern defined by a gap between the mesh lines and substantially corresponds to the area in which the mesh lines are arranged. The mesh lines arranged in the second area AR22 of the second sensor part are connected to each other by the mesh lines arranged in the absent portion VP, and thus the floating patterns FLP electrically separated from each other are not formed. The presence of mesh lines in the portions that correspond to the absent portion VP enables the mesh lines MSL inside the second cut-away portions GP2 to be in electrical communication with the mesh lines MSL outside the second cut-away portions GP2. Accordingly, the conductivity in the second areas AR12 and AR22 is improved as compared to the conductivity in the first areas AR11 and AR21.

As discussed above, in various exemplary embodiments, the third cut-away patterns GP3 are defined in each of the second areas AR12 and AR22 to compensate for differences in the reflectivity that otherwise exist due to the presence of the void portions VP in the second areas AR12 and AR22. A percentage of sum of the void spaces caused by the third cut-away patterns GP3 and the second cut-away patterns GP2 in the peripheral area AP is substantially same as a percentage of sum of the void spaces caused by the first cut-away patterns GP1 in a corresponding area among the center areas CA. Thus, the extent to which patterns are evident in external light reflected by the device 1000 is reduced in this embodiment as compared to embodiments where those percentages are more substantially different, such as the embodiment of FIG. 6B, for example.

Accordingly, a similarity exists between a reflection effect of the external light caused by the first cut-away patterns GP1 and a reflection effect of the external light caused by the space patterns SSP. Thus the difference between the first areas AR11 and AR21 of the first and second sensor parts and the second areas AR12 and AR22 of the first and second sensor parts evident in external light reflected therefrom may be reduced.

Meanwhile, each of the first and second sensor parts SP1-1 and SP2-1 may be the conductive pattern having the bulk structure. In such embodiments, the first, second, and third cut-away patterns GP1, GP2, and GP3 and the boundary BL may be openings defined through at least the portion of the conductive pattern that is integrally formed in a single unit. However, other embodiments may be different in that regard.

Figure 8A:
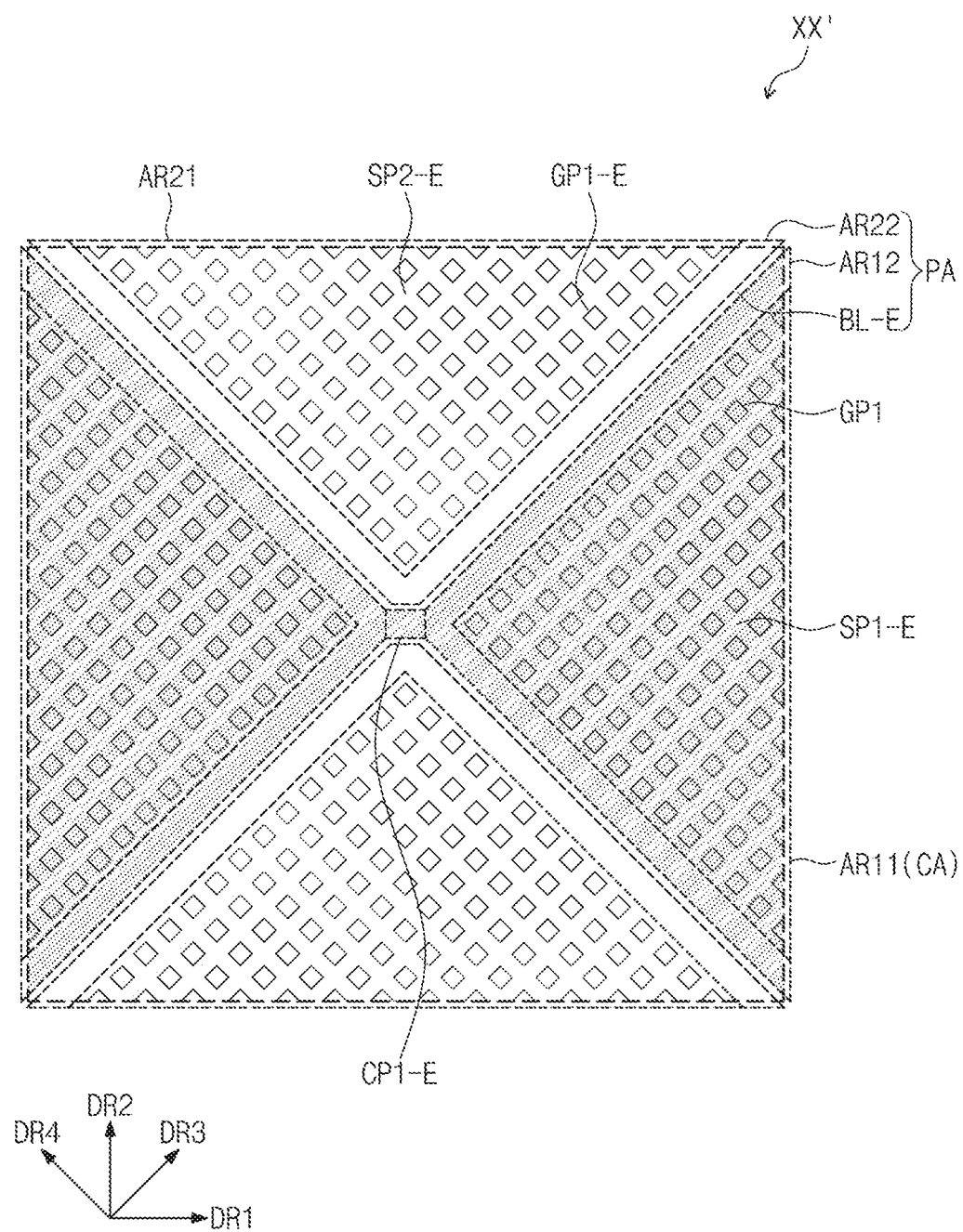
FIG. 8A is an enlarged partial top plan view showing a portion of an electronic device according to a comparative embodiment.
Figure 8B:
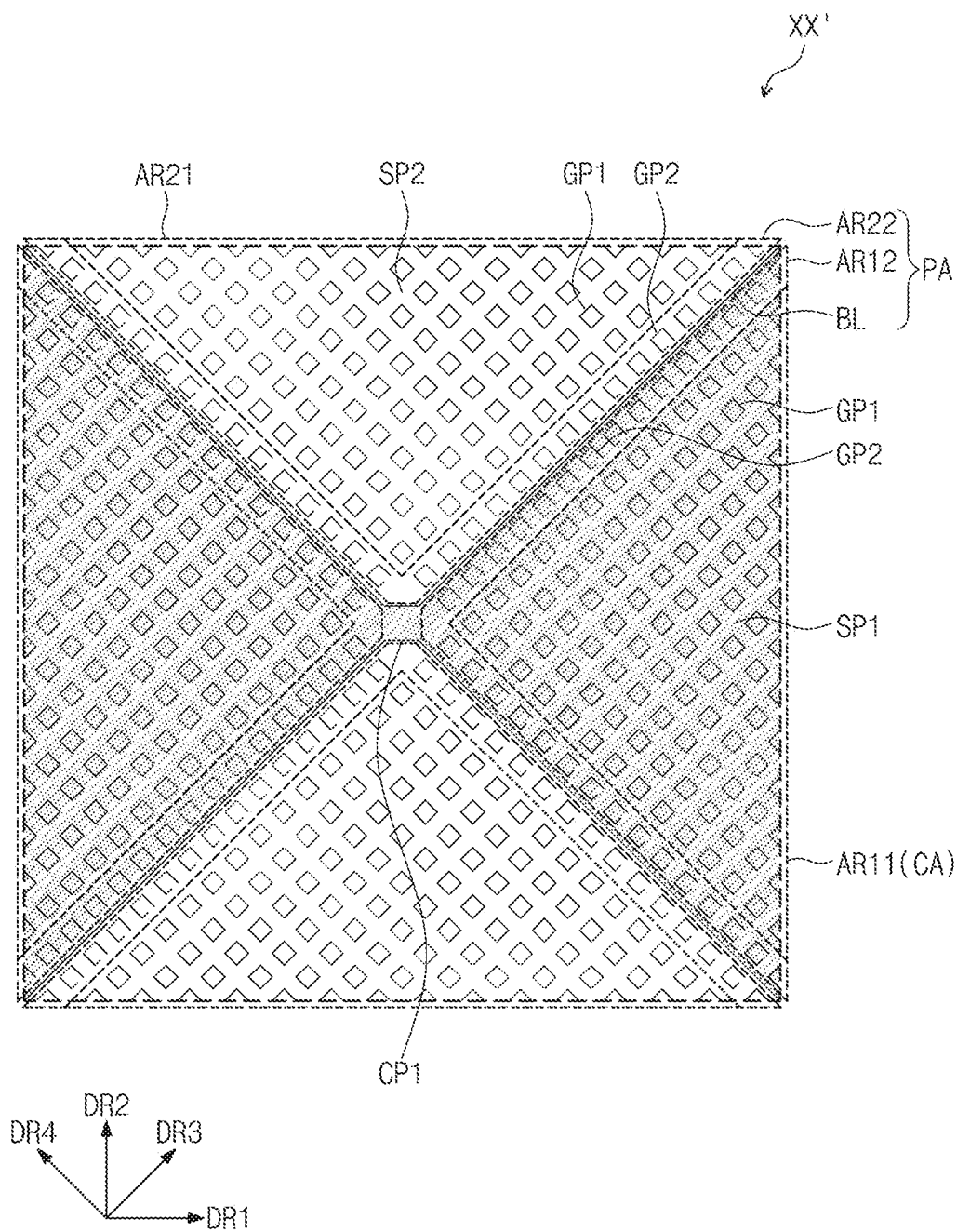
FIG. 8B is a clean version of FIG. 6A having the YY' area markings removed.
Figure 8C:
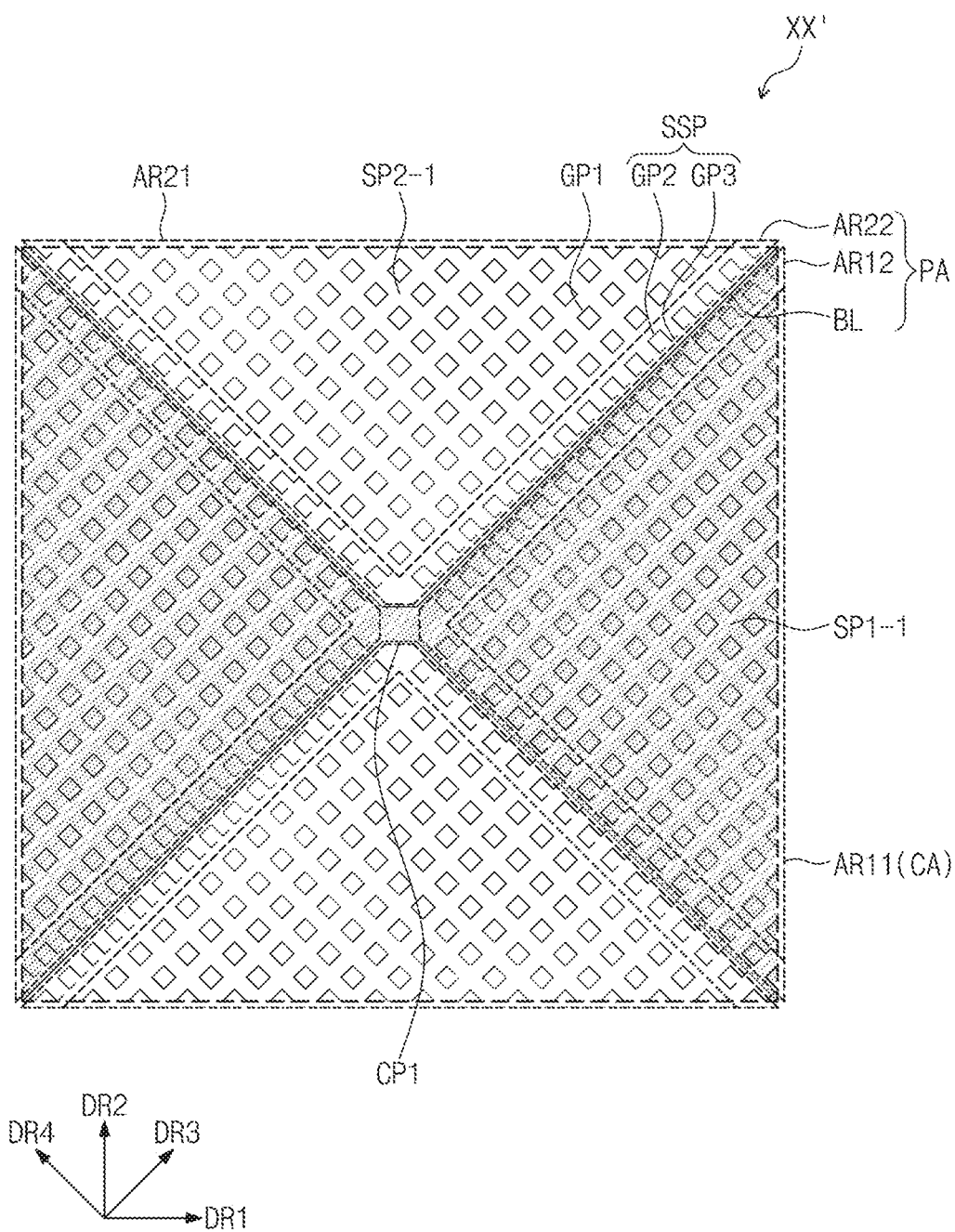
FIG. 8C is an enlarged partial top plan view showing a third exemplary embodiment of area XX' of FIG. 2.

Hereinafter, sensor parts according to the comparison example and the exemplary embodiment of the invention will be described with reference to FIGS. 8A to 8C. In FIGS. 8A to 8C, the same reference numerals denote the same elements in FIGS. 1 to 7B, and thus detailed descriptions of the same elements are unnecessary.

Figure 2:
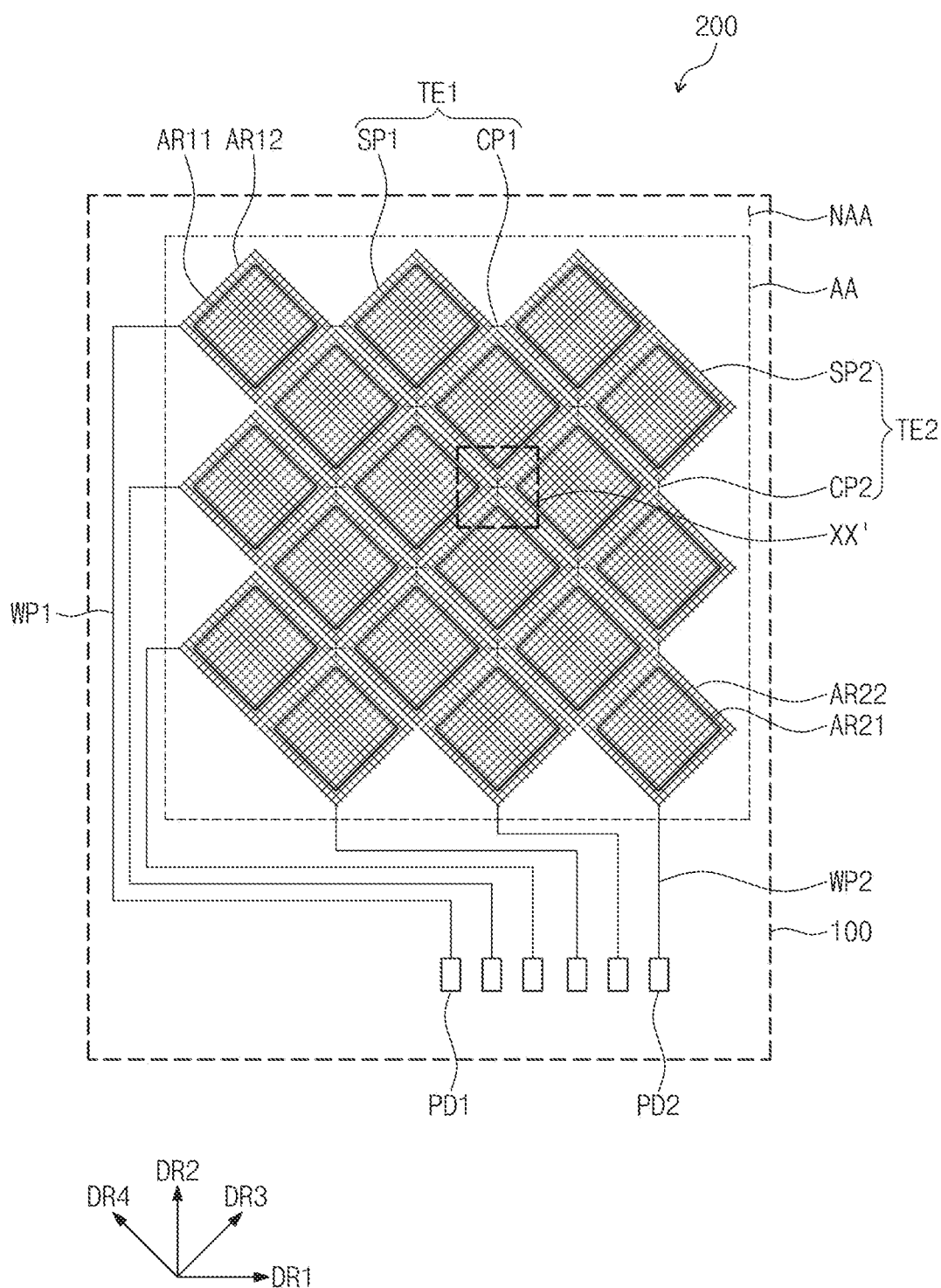
FIG. 2 is a schematic top plan view showing a portion of the components of the exemplary electronic device shown in FIG. 1.

FIGS. 8A to 8C show an area corresponding to the area XX' shown in FIG. 2. In addition, for the convenience of illustration, void spaces defining boundaries BL and BL-E and cut-away patterns GP1-E, GP1, GP2, and GP3 are represented by dotted lines in FIGS. 8A to 8C.

Referring to the comparative embodiment of FIG. 8A, the boundary BL-E is defined between the first sensor part SP1-E and the second sensor part SP2-E, and the first sensor part SP1-E is spaced apart from the second sensor part SP2-E such that the boundary BL-E is disposed between the first and second sensor parts SP1-E and SP2-E.

In this embodiment, the first sensor part SP1-E includes a first area AR11 and a second area AR12, and the second sensor part SP2-E includes a first area AR21 and a second area AR22. A plurality of first cut-away patterns GP1-E is defined in each of the first areas AR11 and AR21 of each of the first and second sensor parts. The first cut-away patterns GP1-E may correspond to the above-mentioned first cut-away patterns GP1.

But, in this comparative embodiment, a separate cut-away pattern is not defined in the second areas AR12 and AR22. Accordingly, the second areas AR12 and AR22 of the first and second sensor parts SP1-E and SP2-E are filled with the mesh lines that are omitted from this figure for ease of illustration of certain features, and spaces in which portions of the mesh lines are cut-away in the second areas AR 12 and AR 22 are omitted.

In the peripheral area PA, a void space corresponding to a predetermined boundary BL-E is defined, but a separate void space is not defined between the boundary BL-E and the center areas CA.

Accordingly, when this embodiment of the electronic device is used and the external light is incident to the electronic device from the outside of the electronic device, various optical phenomena such as reflection, transmission, and so on, may occur while the external light is incident to components arranged in the electronic device.

When that occurs, the reflection when the external light is incident to the area in which the mesh lines are arranged is a visibly different pattern than the reflection when the external light is incident to the void space. For instance, when the external light is incident to the area in which the mesh lines are arranged, most of the external light is reflected, and thus the area in which the mesh lines are arranged is perceived as bright.

Conversely, when the external light is incident to the void space, the amount of the external light reflected by the void space is comparatively lower and the void space is perceived as darker than the perceived brightness of the area with the mesh lines and no void space. As a difference in size or distribution between the void space and the area in which mesh lines are arranged with no void space increases, the difference perceived by the user between the void space and the area in which mesh lines are arranged with no voice space increases.

In the comparison example of FIG. 8A, the void spaces, GP1-E for example, are intensively placed in the center areas CA, and only the boundary BL-E is a void space defined in the peripheral area PA. The boundary BL-E is defined to be spaced apart from the center areas CA. Accordingly, the user visually perceives, in the pattern of the light reflected therefrom, a big difference between the center areas CA and the adjacent peripheral area PA, and between the peripheral area PA and the adjacent boundary BL-E. In various exemplary embodiments, the foregoing undesirable effect is either reduced or eliminated.

Accordingly, various exemplary embodiments of the invention further include the second cut-away patterns GP2 such as those illustrated in FIG. 8B. The second cut-away patterns GP2 are defined in the second areas AR12 and AR22 of the peripheral area PA.

The second cut-away patterns GP2 have shapes similar to those of the first cut-away patterns GP1. When compared with the comparison example of FIG. 8A, the void spaces are relatively uniformly distributed in the first areas AR11 and AR21 of the first and second sensor parts and the second areas AR12 and AR22 of the first and second sensor parts as shown in FIG. 8B.

Accordingly, it is difficult to distinguish the first areas AR11 and AR21 of the first and second sensor parts from the second areas AR12 and AR22 of the first and second sensor parts in reflections of external light from those areas. Accordingly, various exemplary embodiments may reduce the difference perceived by the user between the first areas AR11 and AR21 of the first and second sensor parts and the second areas AR12 and AR22 of the first and second sensor parts in the reflected light is reduced or even rendered entirely imperceptible.

In addition, since the boundary BL between the first sensor part SP1 and the second sensor part SP2 is defined between the second cut-away patterns GP2, in various exemplary embodiments a difference evident in a patter of reflected light between a peripheral area of the boundary BL and the boundary BL is likewise reduced or eliminated. Therefore, it is difficult or impossible for the user to perceive the boundary BL in the reflected light.

As shown in FIG. 8C, the exemplary electronic device of the invention may further include a plurality of third cut-away patterns GP3. The third cut-away patterns GP3 may be located in each of the second areas AR12 and AR22 of the first and second sensor parts SP1 and SP2. The third cut-away patterns GP3 are respectively connected to the second cut away pattern GP2 to define space patterns SSP in the depicted embodiment.

Accordingly, effects exerted on the reflection of the external light by the void spaces in the peripheral area PA may be more similar to effects exerted on the reflection of the external light by the void spaces in the center areas CA than in the embodiment of FIG. 6A and FIG. 6B for at least the following reasons. The inclusion of the third cut-away patterns GP3 causes the difference between the first areas AR11 and AR21 and the second areas AR12 and AR22 and the difference between the center areas CA and the peripheral area AP to be reduced more than that difference is reduced by the embodiment of FIG. 6A because the total size of each one of the second cut away patterns GP2 plus the third cut-away pattern connected thereto in the embodiment of FIG. 8C is substantially the same as the size of the first cut away patterns GP1 in that embodiment.

Figure 9A:
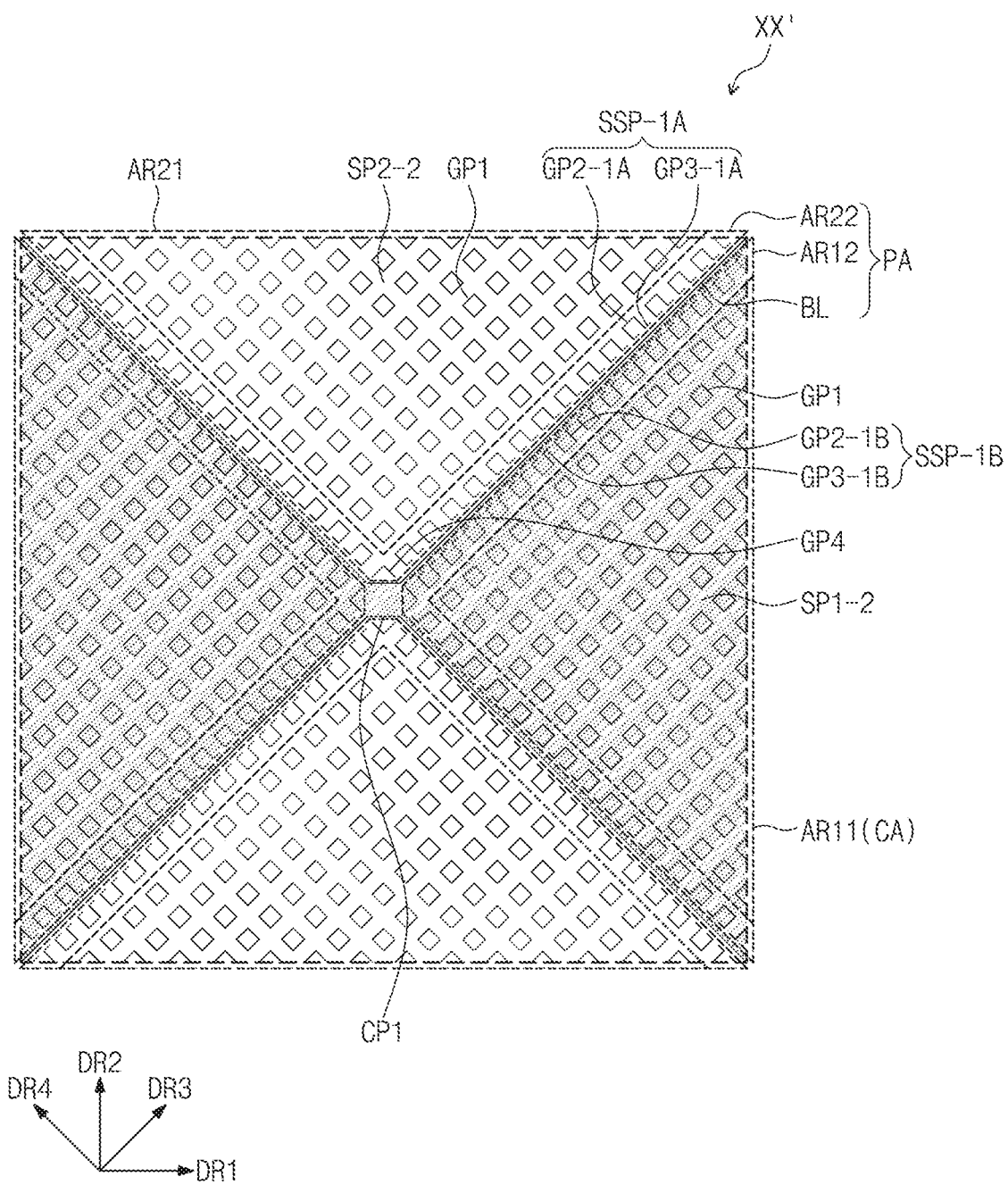
FIG. 9A is an enlarged partial top plan view showing a fourth exemplary embodiment of area XX' of FIG. 2.
Figure 9B:
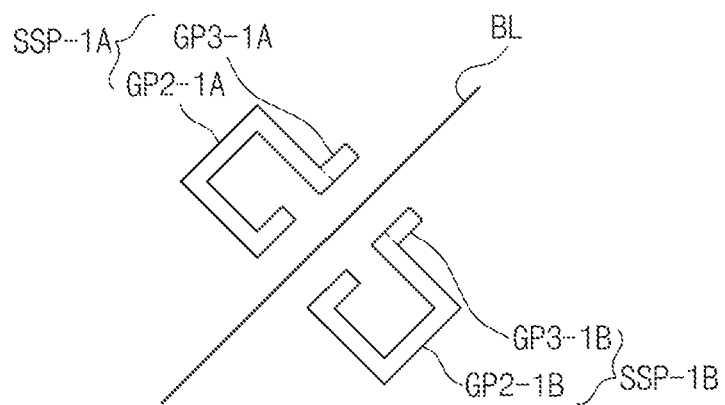
FIG. 9B is an enlarged partial schematic top plan view showing a portion of the detail shown in FIG. 9A.
Figure 9B:
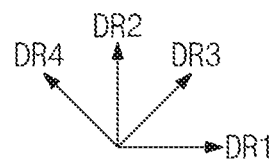

In exemplary embodiment of the invention shown in FIGS. 9A and 9B, the same reference numerals denote the same elements in FIGS. 1 to 8C, and thus a detailed descriptions of the same elements are unnecessary. In addition, for the convenience of explanation, some patterns among cut-away patterns are assigned with reference numerals while other orientations of the cut-away patterns with respect to the adjacent boundary line BL are not.

A plurality of second cut-away patterns GP2-1A and GP2-1B may have shapes similar or identical in the cut-away area to the first cut away patterns GP1. The second cut-away patterns GP2-1A and GP2-1B may have the same shape as each other or a different shape from each other.

As shown in FIG. 9A, the second cut-away patterns GP2-1A and GP2-1B and a plurality of third cut-away patterns GP3-1A and GP3-1B are arranged in the peripheral area PA in various ways with respect to the boundary BL. For instance, the second cut-away patterns GP2-1A and GP2-1B have the same shape as each other and are arranged in substantially the same orientation with respect to cut-away patterns adjacent thereto or randomly arranged. However, the boundary line BL has four different orientations with respect to the space patterns SSP depending on the location of a given space pattern SSP. In subsequent embodiments described as having symmetrical arrangements of space patterns SSP, the symmetrical arrangement is variously described as having rotational symmetry, a line symmetry, and a point symmetry as defined below. A rotational symmetry is present if one space pattern can be converted into another space pattern by rotation of some amount other than 360 degrees around an axis that extends orthogonally to the plane of the page of the various Figures. A line symmetry is present if one space pattern can be converted into another space pattern by rotation of 180 degrees over a specified axis that extends in the plane of the page of the various Figures. And, a point symmetry is present if one space pattern lacks the same shape and orientation as another space pattern, cannot be converted to the other space pattern by either rotational symmetry or line symmetry, but can be converted to the other space pattern upon rotating some amount greater than zero and less than 360 degrees about an axis that extends orthogonally to the plane of the page of the various Figures and then further rotating 180 degrees about an axis that exists in the plane of the page in the various Figures.

FIG. 9A shows an exemplary embodiment in which the second cut-away patterns GP2-1A and GP2-1B are arranged linearly symmetrical with the cut-away patterns facing the second cut-away patterns GP2-1A and GP2-1B with reference to the boundary BL. A pattern defined by connecting the second cut-away patterns GP2-1A and GP2-1B with respective ones of the third cut-away patterns GP3-1A and GP3-1B may be arranged linearly symmetrical with the pattern facing the resulting combined pattern (defined by connecting the second cut-away patterns GP2-1A and GP2-1B and the respective ones of the third cut-away patterns GP3-1A and GP3-1B) with reference to the boundary BL.

For instance, the second cut-away patterns GP2-1B arranged in the second area AR12 of the first sensor part SP1-2 are arranged linearly symmetrical with respect to the second cut-away patterns GP2-1A arranged in the second area AR22 of the second sensor part SP2-2 with reference to the boundary BL adjacent thereto. Thus, the second cut-away patterns GP2-1B combined with the third cut-away patterns GP3-1B of the first sensor part SP1-2 are also arranged respectively linearly symmetrical with respect to the second cut-away patterns GP2-1A combined with the third cut-away patterns GP3-1A of the second sensor part SP2-2 with reference to the boundary BL.

In addition, the second cut-away patterns GP2-1A and GP2-1B are respectively connected to the third cut-away patterns GP3-1A and GP3-1B to define space patterns SSP-1A and SSP-1B. The space patterns SSP-1B arranged in the first sensor part SP1-2 are linearly symmetrical with respect to respective ones of the space patterns SSP-1A arranged in the second sensor part SP2-2 facing the space pattern SSP-1B with reference to the boundary BL.

As shown greater detail in FIG. 9B, the second cut-away pattern GP2-1B arranged in the second area AR12 of the first sensor part is arranged linearly symmetrical with respect to the second cut-away pattern GP2-1A arranged in the second area AR22 of the second sensor part with reference to the boundary BL adjacent thereto. In addition, the third cut-away pattern GP3-1B arranged in the second area AR12 of the first sensor part are linearly symmetrical with respect to the third cut-away patterns GP3-1A arranged in the second area AR22 of the second sensor part with reference to the boundary BL adjacent thereto.

Accordingly, the space pattern SSP-1B arranged in the second area AR12 of the first sensor part is linearly symmetrical with respect to the space pattern SSP-1A arranged in the second area AR22 of the second sensor part with reference to the boundary BL adjacent thereto. In other embodiments, the second cut-away patterns GP2-1A and GP2-1B and the third cut-away patterns GP3-1A, GP3-1B may be arranged in various other arrangements.

In various exemplary embodiments, referring back to FIG. 9A, each of the first sensor part SP1-2 and the second sensor part SP2-2 may further include at least one fourth cut-in pattern GP4. The fourth cut-away pattern GP4 is defined in an area adjacent to the first connection part CP1 among the first sensor parts SP1-2 or in an area adjacent to the second connection part CP2 (see FIG. 2) among the second sensor parts SP2-2. Accordingly, the fourth cut-away pattern GP4 of the second sensor part SP2-2 may be defined in a corner area facing adjacent second sensor part SP2-2 on an opposing side of the connector CP1, and in a like manner in the first sensor parts SP1-2.

The fourth cut-away part GP4 is defined to be spaced apart from the boundary BL. The fourth cut-away part GP4 corresponds to a shape of a portion or all of two connected sides of one first cut-away pattern GP1 or one second cut-away pattern GP2. By way of example, GP4 may have a shaped defined by two orthogonal sides of GP1 or GP2.

Consistent with the inventive principles for reducing perceivable differences in the patterns in reflections described above, in embodiments where the first sensor part SP1-2 and the second sensor part SP2-2 further include the fourth cut-away pattern GP4, a predetermined void space is defined in an area of the second areas AR12 and AR22, where a difference in the patterns in the reflected light would otherwise be more visible. Accordingly, the potentially perceivable difference between areas of the first sensor part SP1-2 and the second sensor part SP2-2 adjacent to the connection part CP1 may be reduced or eliminated, and thus the first areas AR11 and AR21 and the second areas AR12 and AR22 may be further prevented from being perceived by the user as differences in the pattern in the reflected light for embodiments that include the fourth cut-away part GP4.

Figure 10A:
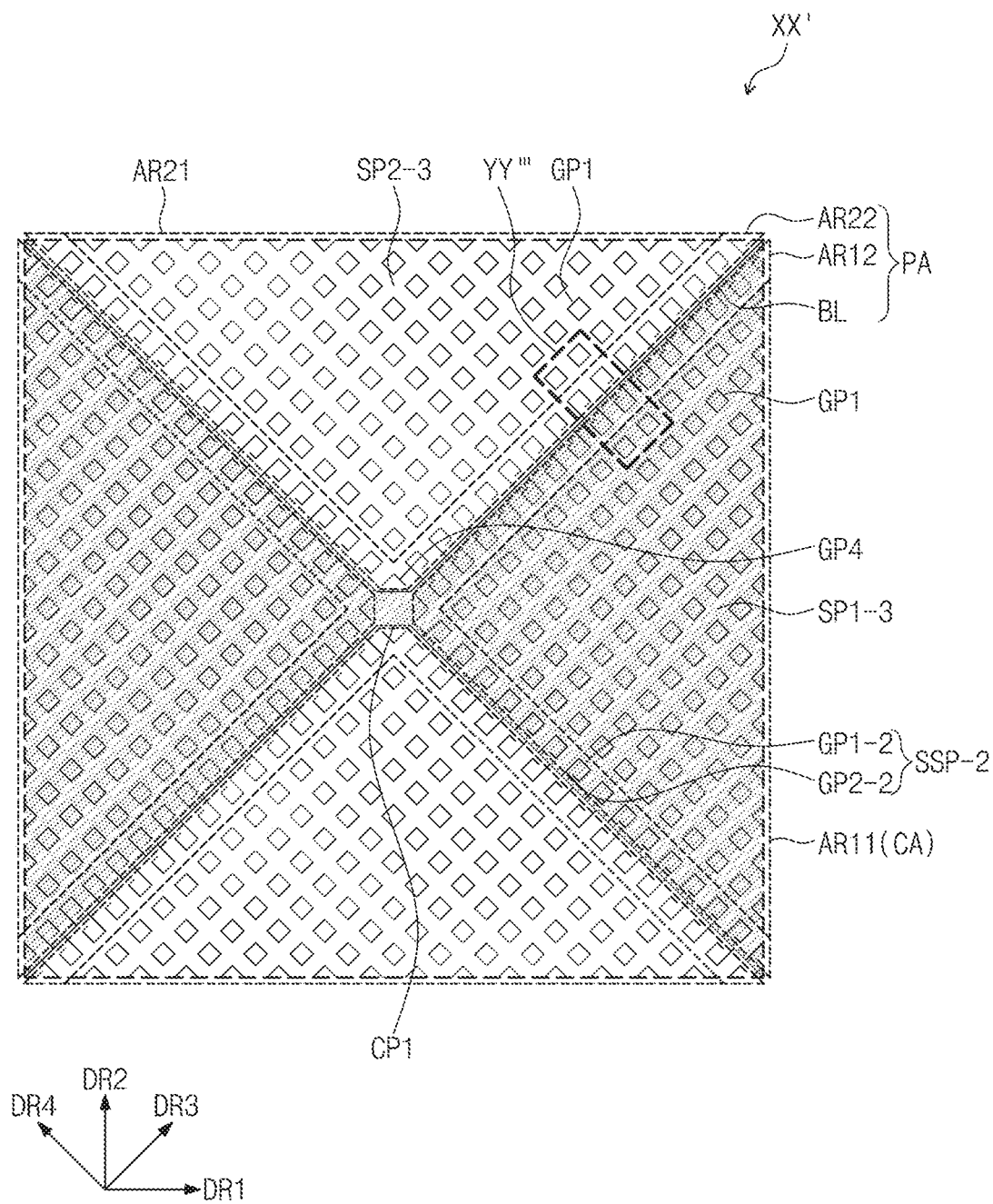
FIG. 10A is an enlarged partial top plan view showing a fifth exemplary embodiment of area XX' of FIG. 2.

For the convenience of explanation, FIG. 10A shows an area corresponding to the area XX' of FIG. 2. In FIG. 10A, to increase visibility of the features discussed, the mesh lines are omitted, and cut-away patterns and void spaces are indicated by a solid line. In addition, for the convenience of explanation, a first sensor parts SP1-3 and first connection part CP1 are shaded in FIGS. 10A and 10B to differentiate from second sensor parts SP2-3.

Figure 10B:
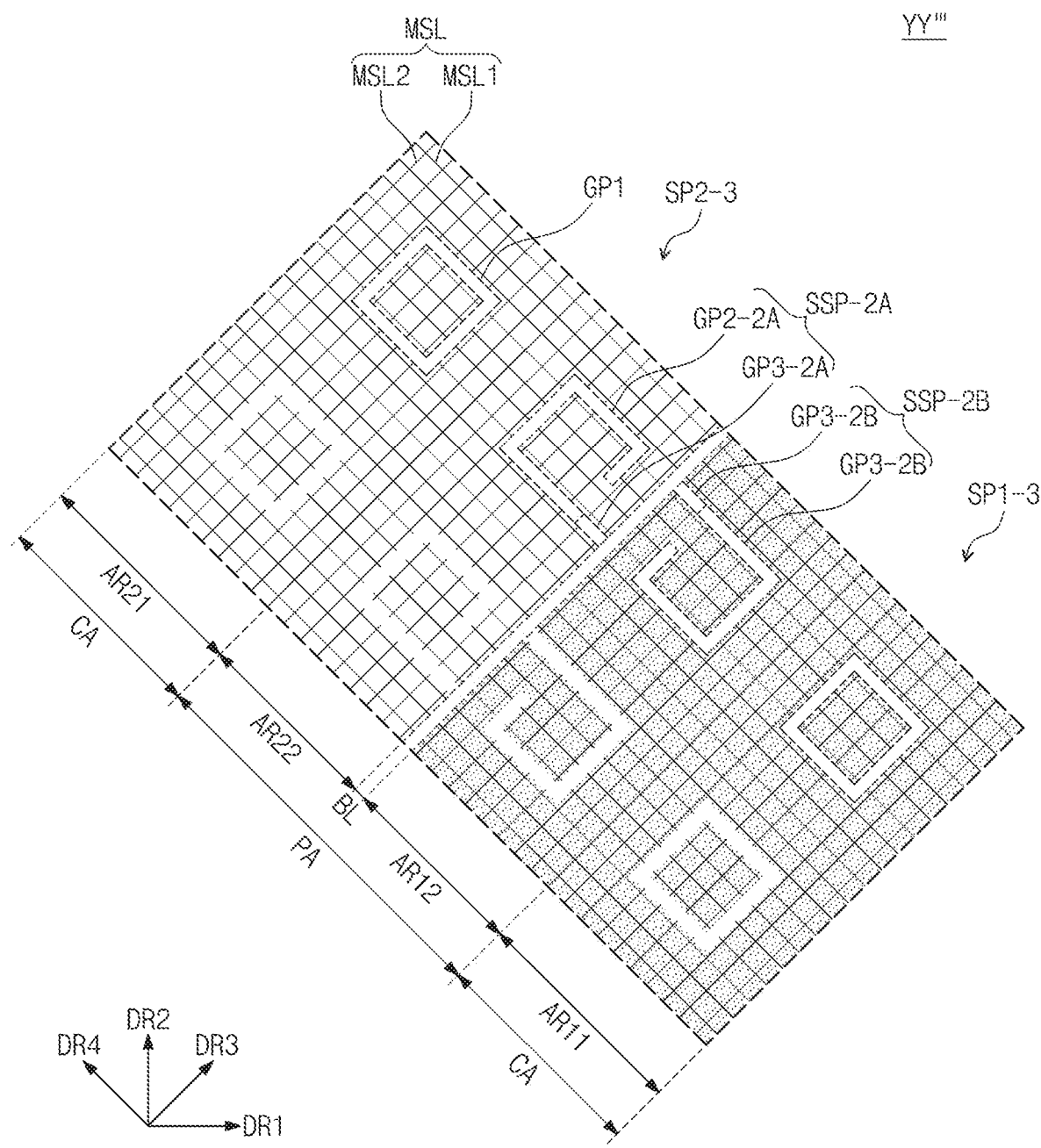
FIG. 10B is an enlarged partial top plan view showing area YY''' of FIG. 10A.

Hereinafter, the electronic device according to the exemplary embodiment of FIGS. 10A and 10B will be described in detail. In FIGS. 10A and 10B, the same reference numerals denote the same elements in FIGS. 1 to 8, and thus detailed descriptions of the same elements are unnecessary.

Some cut-away patterns among a plurality of second cut-away patterns GP2-2 and a plurality of third cut-away patterns GP3-2 may be connected to a boundary BL. In the exemplary embodiment depicted, the third cut-away patterns GP3-2 are all connected to the boundary BL at one end of each third cut-away pattern GP3-2.

Some second cut-away patterns GP2-2 among the second cut-away patterns GP2-2 of the first sensor part SP1-3 are rotationally symmetrical with each other. For instance, the second cut-away patterns arranged in the third direction DR3 among the second cut-away patterns of the first sensor part SP1-3 have substantially the same shape as the second cut-away patterns arranged in the fourth direction DR4 when rotated at a predetermined angle of about 90 degrees.

FIG. 10B shows space patterns SSP-2A and SSP-2B disposed in the area YY' of a space pattern SSP-2. As shown in FIG. 10B, the space pattern SSP-2A disposed in the area YY' of the space pattern SSP-2 and defined in the second area AR22 of the second sensor part is rotationally symmetrical with respect to the space pattern SSP-2B defined in the second area AR12 of the first sensor part upon a rotation of about 180 degrees.

Figure 10C:
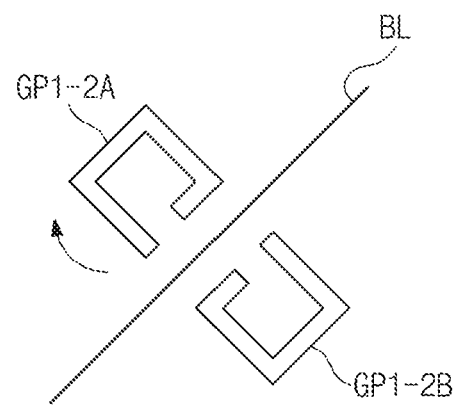
FIG. 10C is an enlarged partial schematic top plan view showing a portion of the detail shown in FIG. 10A and FIG. 10B.
Figure 10C:
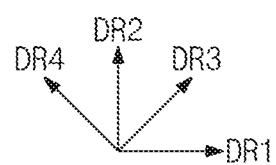

For the convenience of explanation, FIG. 10C shows only portions of the space patterns SSP-2A and SSP-2B, as shown in FIG. 10C, the second cut-away pattern GP2-2A defined in the second area AR22 of the second sensor part is not linearly symmetrical with the second cut-away pattern GP2-2B defined in the second area AR12 of the first sensor part.

However, when the second cut-away pattern GP2-2A defined in the second area AR12 of the first sensor part rotates in an arrow direction at an angle of about 180 degrees, the second cut-away pattern GP2-2A defined in the second area AR12 may have substantially the same shape as that of the second cut-away pattern GP2-2A defined in the second area AR22 of the second sensor part. In other embodiments, the rotation angle of the second cut-away pattern GP2-2A to achieve rotational symmetry is an angle other than 180 degrees.

Referring to FIGS. 10A to 10C again, each of the third cut-away patterns GP3-2 connects the boundary BL and a corresponding second cut-away pattern of the second cut-away patterns GP2-2 to define the space pattern SSP-2. Accordingly, as shown in FIG. 9B, the void space may be consecutively defined by the boundary BL and the space pattern SSP-2 as one single connected void space by way of intervening void spaces defined by third cut-away patterns GP3-2 connecting the boundary BL void space to the second cut-away pattern GP2-2 void space.

When the boundary BL is connected to the second cut-away patterns GP2-2 through intervening third cut-away patterns GP3-2, the boundary BL and the second and third cut-away patterns GP2-2 and GP3-2 are perceived as one continuous space. Thus, in the reflected light, the visible pattern of the boundary BL and the space pattern SSP-2 connected to the boundary BL may have a high degree of similarity to the visible pattern of the first cut-away patterns GP1 in the reflected light. Again, this reduces the extent to which undesirable differences are evident in the pattern(s) visible in the reflected light.

Among the space patterns SSP-2, space patterns facing each other such that the boundary BL is disposed between the space patters are rotationally symmetrical with each other in this embodiment, but other embodiments are different. The second cut-away pattern GP2-2 and the third cut-away patterns GP3-2 may be arranged in a variety of different ways in different embodiments.

The cut-away pattern SSP-2 connected to the boundary BL allows the user to perceive the boundary as a portion of the space pattern. Thus, the electronic device according to the present exemplary embodiment includes the cut-away pattern SSP-2 connected to the boundary BL, and thus the boundary BL between the first and second sensor parts SP1-3 and SP2-3 might not be perceptible.

In various exemplary embodiments, each of the first and second sensor parts SP1-3 and SP2-3 may be the conductive pattern having the bulk structure. And, the first, second, and third cut-away patterns GP1, GP2-2, and GP3-2 and the boundary BL may be openings defined through at least the portion of the conductive pattern that is integrally formed in a single unit.

Figure 11:
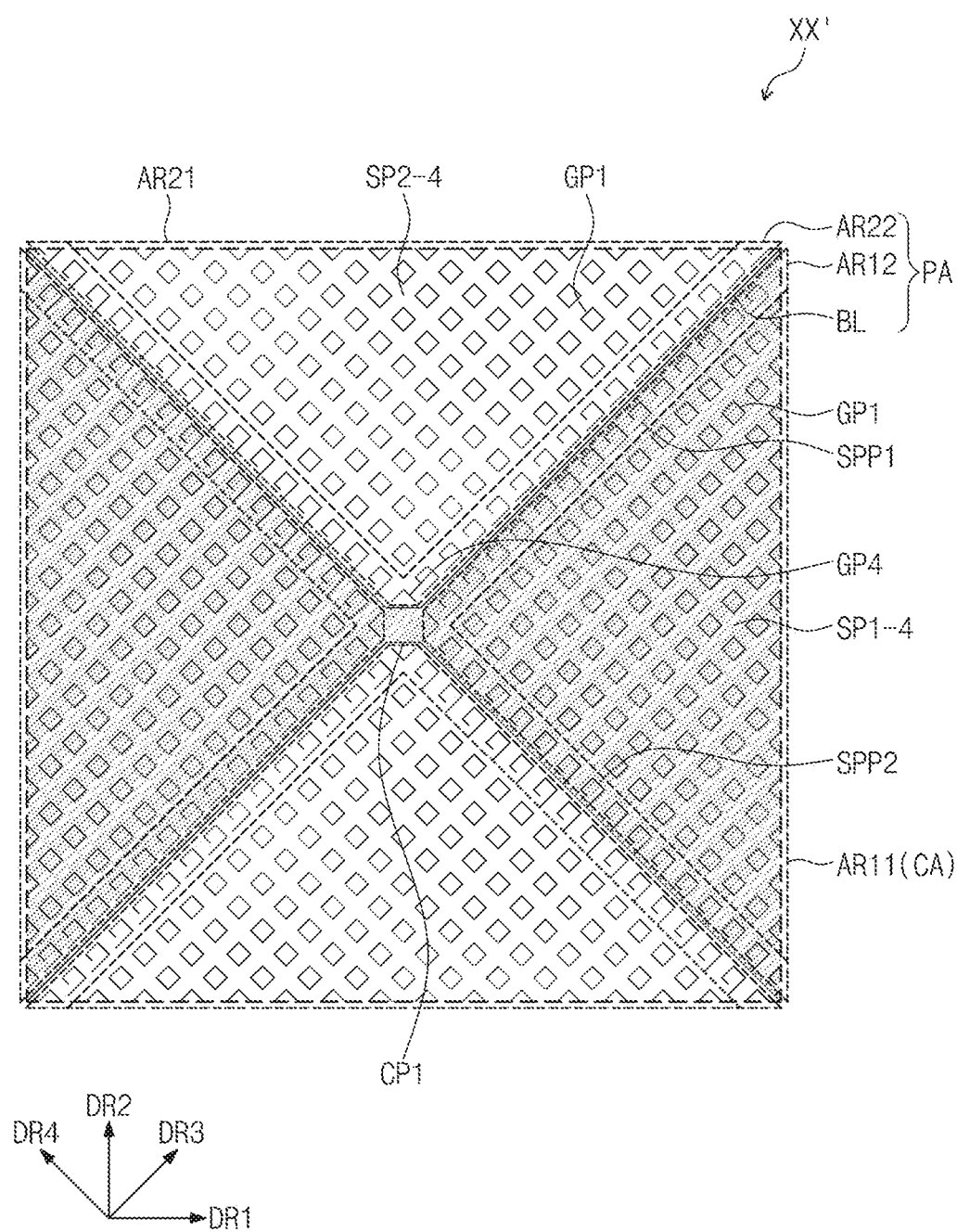
FIG. 11 is an enlarged partial top plan view showing a sixth exemplary embodiment of area XX' of FIG. 2.

For the convenience of explanation, the exemplary embodiment of FIG. 11 shows an area corresponding to the area XX' of FIG. 2. In FIG. 11, cut-away patterns are indicated by a solid line, and a first sensor parts SP1-4 and a first connection part CP1 are shaded.

Referring to FIG. 11, each of a first sensor part SP1-4 and a second sensor part SP2-4 includes a plurality of first space patterns SSP1 not connected to a boundary BL and a plurality of second space patterns SSP2 connected to the boundary BL.

Each of the first space patterns SPP1 is defined by a second cut-away pattern and a third cut-away pattern, which are disposed spaced apart from the boundary BL. Each of the second space pattern SPP2 is defined by the second cut-away pattern disposed spaced apart from the boundary BL and a third cut-away pattern connecting the boundary BL and the second cut-away pattern. In the embodiment of FIG. 11, all of the space patterns SPP1 and SPP2 have the same size, shape and orientation. Thus, the space patterns SPP1 and SPP2 in FIG. 11 have four different orientations with respect to the boundary BL depending on the location of a given space pattern SPP1, SPP2.

As shown in FIG. 11, the second cut-away patterns GP2 (refer to FIG. 7A) or the third cut-away pattern GP3 (refer to FIG. 7B) may be arranged in various ways. In the electronic device according to the present exemplary embodiment, the cut-away patterns may have various shapes as long as the cut-away patterns GP2 plus GP3 have the similar shape and volume to that of the first cut-away patterns GP1, and the cut-away patterns may be arranged such that the shapes of cut-away patterns adjacent to each other have different shapes.

As described above, since the electronic device includes the cut-away patterns arranged in various arrangements, the boundary BL may be prevented from being perceived as a pattern difference in reflected light, and the difference between the center areas CA and the peripheral area PA evident in the reflected light may be reduced or even eliminated.

Figure 12:
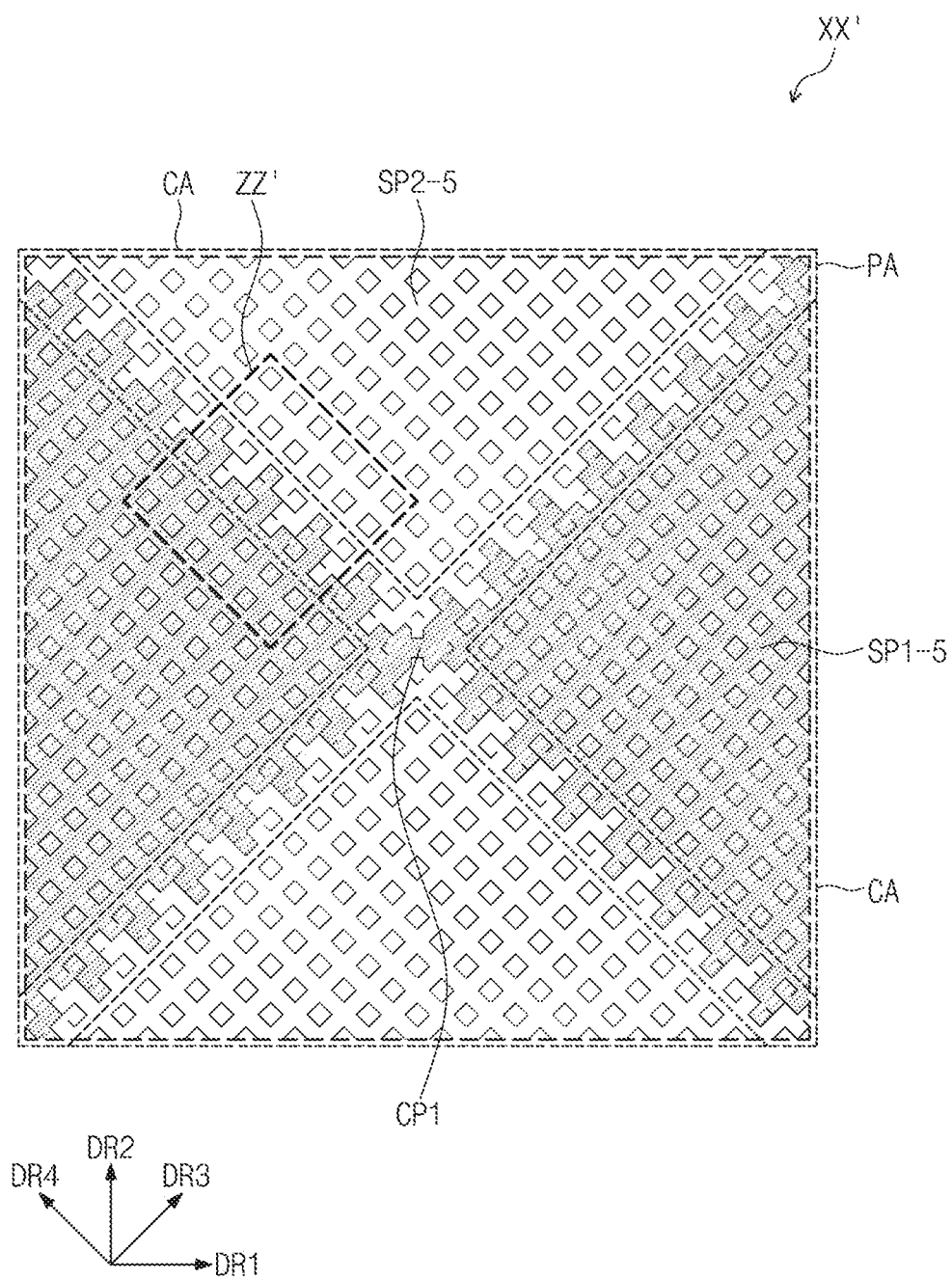
FIG. 12 is an enlarged partial top plan view showing a seventh exemplary embodiment of area XX' of FIG. 2.
Figure 13A:
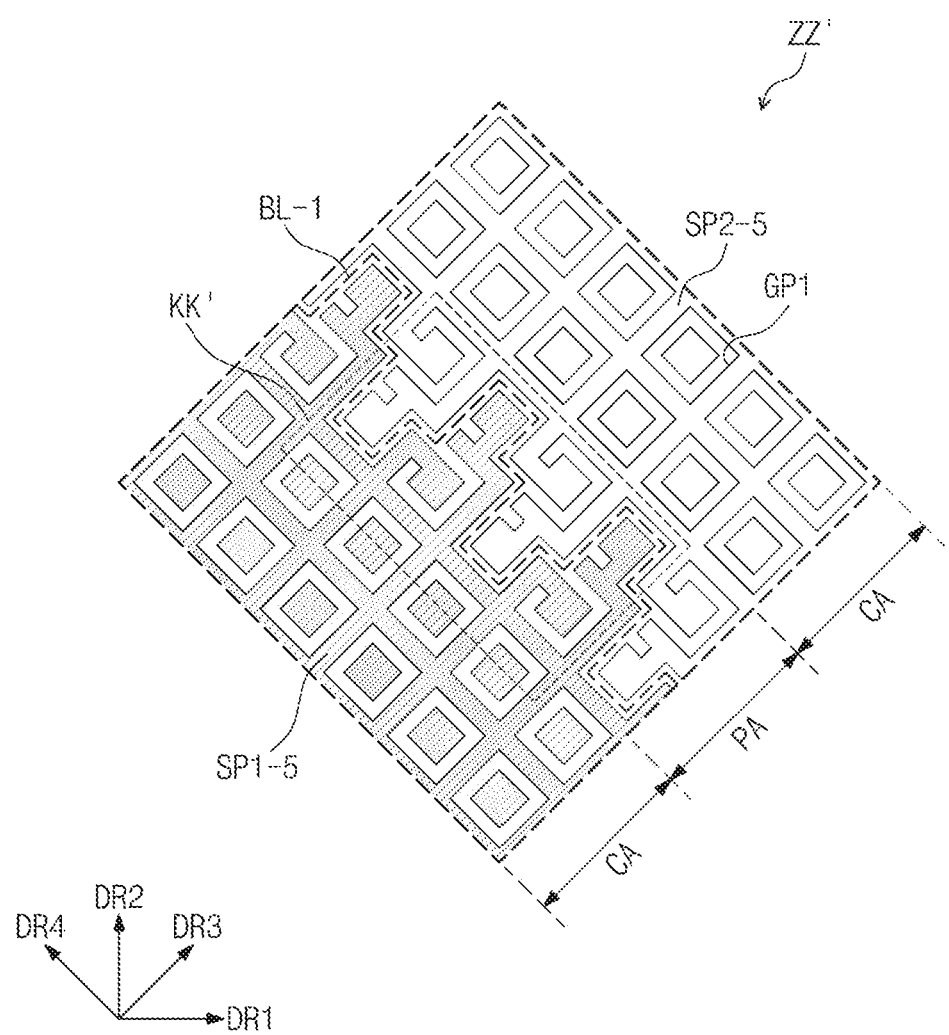
FIGS. 13A to 13C are further enlarged partial top plan views showing area ZZ' of FIG. 12 with different features emphasized.
Figure 13B:
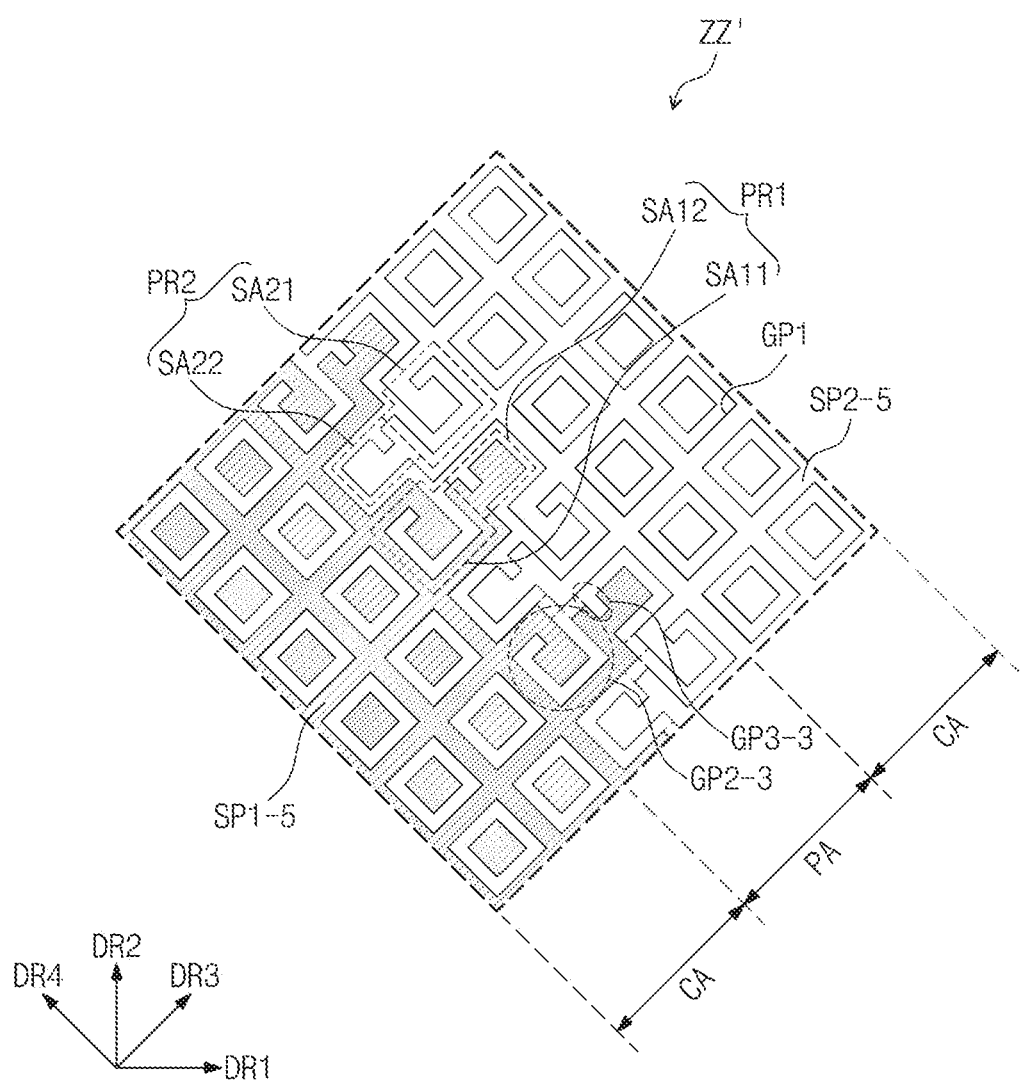
Figure 13C:
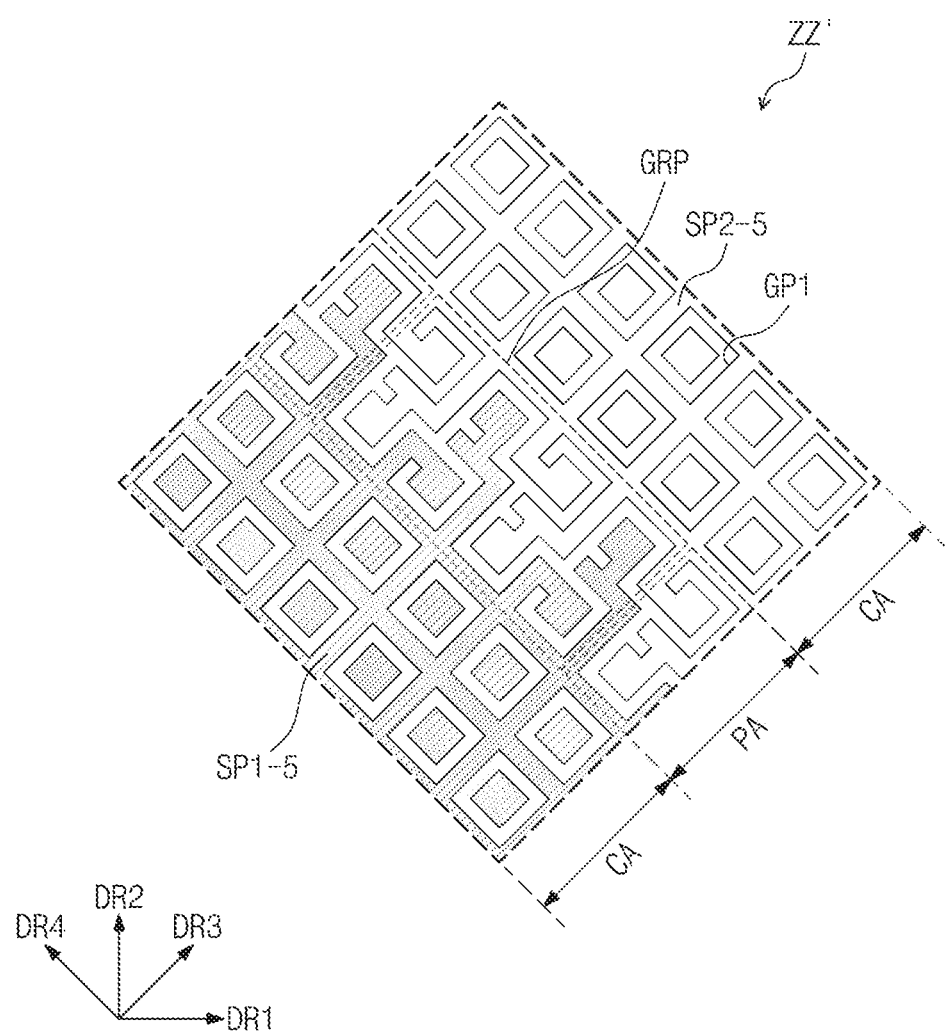

In the embodiments of FIGS. 12 and 13A-13c, patterns defined by void spaces are indicated by a solid line in FIG. 12 and are indicated by the void spaces in FIGS. 13A to 13C. In addition, in FIGS. 12 to 13C, mesh lines are omitted, and, for clarity of illustration, a first sensor parts SP1-5 and a first connection parts CP1 corresponding to a first electrode are shaded. Also for the convenience of explanation, FIGS. 13A to 13C show the same area, but a virtual area or a boundary is partially omitted.

Hereinafter, the electronic device according to the exemplary embodiment will be described in detail with reference to FIGS. 12 to 13C. In FIGS. 12 to 13C, the same reference numerals denote the same elements in FIGS. 1 to 11, and thus detailed descriptions of the same elements are unnecessary.

As described above, in various exemplary embodiments, the electronic device includes a plurality of center areas CA and a peripheral area PA distinguished from the center areas CA when viewed in a plan view. Each of the center areas CA is defined in a first sensor part SP1-5 and a second sensor part SP2-5.

The peripheral area PA is disposed adjacent to each of the center areas CA. In the exemplary embodiment illustrated, the peripheral area PA has a shape to surround each of the center areas CA. A plurality of first cut-away patters GP1 is defined in each of the center areas CA, and a boundary BL-1 is defined in the peripheral area PA.

Referring to FIGS. 12 and 13A, the boundary BL-1 disposed between the first sensor part SP1-5 and the second sensor part SP2-5 has a zigzag shape. The boundary BL-1 is defined in the peripheral area PA, and the boundary BL-1 has a shape that is repeatedly protruded toward the first sensor part SP1-5 and then toward the second sensor part SP2-5.

The peripheral area PA in the depicted exemplary embodiment may be defined by various ways. For instance, as shown in FIG. 13B, the peripheral area PA may include a plurality of protruding areas PR1 and PR2 defined by the boundary BL-1 and the center areas CA.

Accordingly, the first sensor part SP1-5 includes one center area CA and a plurality of protruding areas PR1 disposed adjacent to the one center area CA. Similarly, the second sensor part SP2-5 includes one center area CA and a plurality of protruding areas PR2 disposed adjacent to the one center area CA.

The protruding areas PR1 of the first sensor part are alternately arranged with the protruding areas PR2 of the second sensor part in the fourth direction DR4. The protruding areas PR1 of the first sensor part face the protruding areas PR2 of the second sensor part such that the boundary BL-1 is disposed between the protruding areas PR1 of the first sensor part and the protruding areas PR2 of the second sensor part. The protruding areas PR1 of the first sensor part are arranged such that they are engaged with the protruding areas PR2 of the second sensor part along the boundary BL-1.

Each of the protruding areas PR1 of the first sensor part SP1-5 includes a first sub-area SA11 and a second sub-area SA12 connected to the first sub-area SA11. The first sub-area SA11 of the first sensor part is disposed adjacent to the center area CA of the sensor part SP1-5, and the second sub-area SA21 of the first sensor part is disposed adjacent to the center area CA of the second sensor part SP1-5.

Similarly, each of the protruding areas PR2 of the second sensor part SP2-5 includes a first sub-area SA21 and a second sub-area SA22 connected to the first sub-area SA21. The first sub-area SA21 of the second sensor part is disposed adjacent to the center area CA of the sensor part SP2-5, and the second sub-area SA22 of the second sensor part is disposed adjacent to the center area CA of the first sensor part SP1-5.

The second sub-area SA12 of the first sensor part is surrounded by the first sub-area SA11 of the first sensor part, the first sub-area SA21 of the second sensor part SP1-5, and the center area CA of the second sensor part. Similarly, the second sub-area SA22 of the second sensor part is surrounded by the first sub-area SA11 of the first sensor part, the first sub-area SA21 of the second sensor part, and the center area CA of the second sensor part SP1-5.

A width in the fourth direction DR4 of each of the first sub-areas SA11 and SA21 may be greater than a width in the fourth direction DR4 of each of the second sub-areas SA12 and SA22. Accordingly, the boundary BL-1 has the zigzag shape having a stepped shape. Accordingly, a second cut-away pattern GP2-3 may be defined in each of the first sub-area SA11 of the first sensor part and the first sub-area SA21 of the second sensor part. The second cut-away pattern GP2-3 may be connected to the boundary BL-1.

The peripheral area PA according to the exemplary embodiment illustrated may also be defined in a variety of ways. As described above, the peripheral area PA is defined by the boundary BL-1 and second and third cut-away patterns GP2-3 and GP3-3, which are defined between the boundary BL-1 and the center area CA.

Thus, the boundary BL-1 is defined separated from the second cut-away pattern GP2-3 and the third cut-away pattern GP3-3, and the second cut-away pattern GP2-3 and the third cut-away pattern GP3-3 are connected to the boundary BL-1.

A shape in which the third cut-away pattern GP3-3 is connected to the boundary BL-1 in each of the second sub-areas SA21 and SA22 may correspond to the shape of the second cut-away pattern GP2-3. That is, a portion of the boundary BL-1 and the third cut-away pattern GP3-3 connected to the portion of the boundary BL-1 may have substantially the same shape as the second cut-away pattern GP2-3.

As shown in FIG. 13B, the third cut-away pattern GP3-3 is defined in each of the second sub-area SA21 of the first sensor part and the second sub-area SA22 of the second sensor part. The third cut-away pattern GP3-3 is connected to the boundary BL-1.

As described above, the peripheral area PA may be defined by the second cut-away pattern GP2-3 and the third cut-away pattern GP3-3. The boundary BL-1 is defined by the second cut-away pattern GP2-3 and the third cut-away pattern GP3-3.

In this case, the boundary BL-1 is defined by connecting a portion of the second cut-away pattern GP2-3 and the third cut-away pattern GP3-3. This will be described in detail later.

The shape of the boundary BL-1 between the first sensor part SP1-5 and the second sensor part SP2-5 or the first and second sensor parts SP1-5 and SP2-5 is determined depending on the shapes or the arrangements of the second cut-away patterns GP2-3 and the third cut-away patters GP3-3.

Referring to FIG. 13C, the peripheral area PA is defined by a plurality of group patterns GRP arranged in the fourth direction DR4. The group patterns GRP are defined in the peripheral area PA along the third direction DR3 or the fourth direction DR4.

FIG. 13C shows the group patterns arranged in the fourth direction DR4, and the group patterns GRP are disposed between the center area CA of the first sensor part SP1-5 and the center area CA of the second sensor part SP2-5 and connected to each other.

The boundary BL-1 may be defined in the group patterns GRP. This will be described in detail later.

Figure 14:
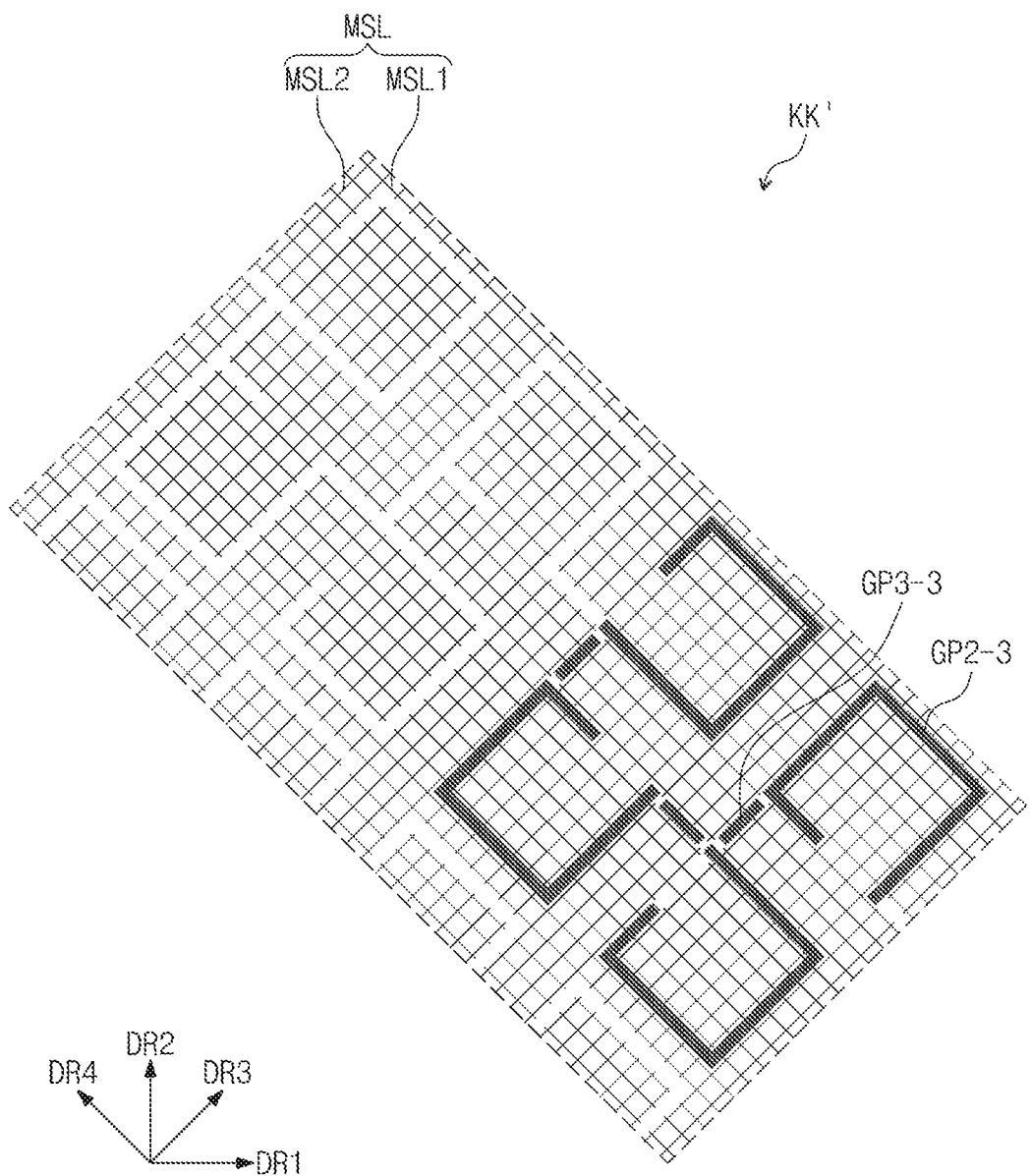
FIG. 14 is a still further enlarged partial top schematic plan view showing area KK' of FIG. 13A with certain features emphasized.
Figure 15A:
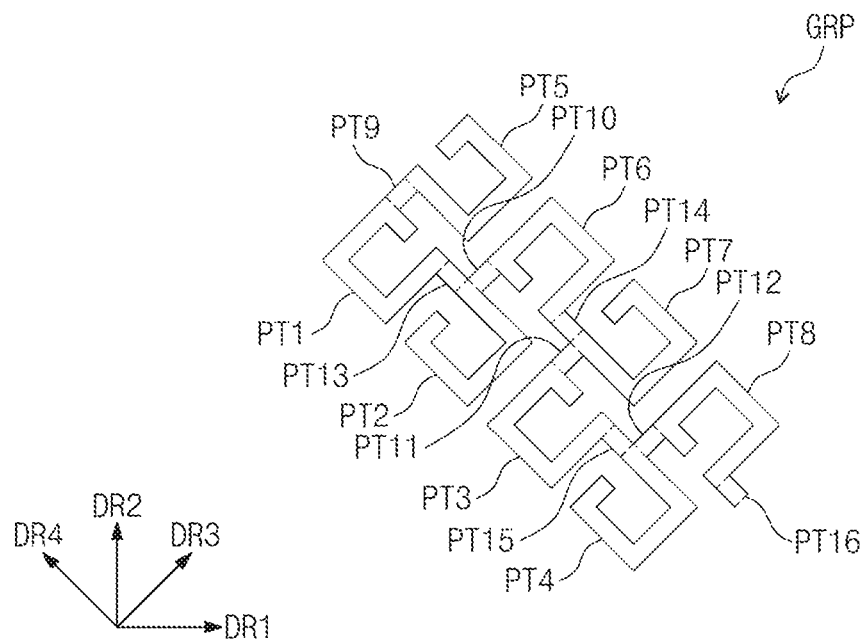
FIG. 15A is a partial top schematic plan view showing certain components of the seventh embodiment of FIG. 12 to FIG. 14.
Figure 15B:
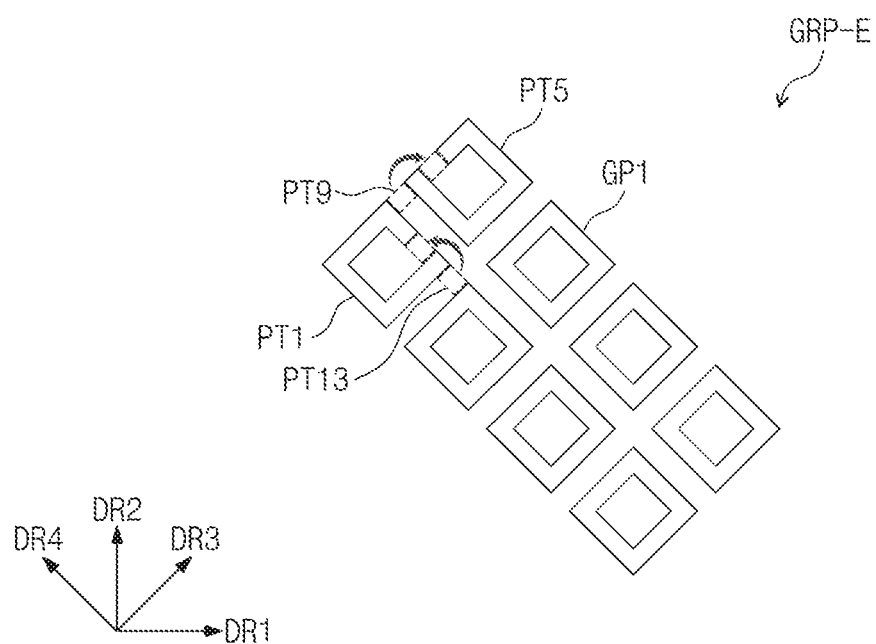
FIG. 15B is a partial top schematic plan view showing a comparative example of the components shown in FIG. 15A.

FIG. 14 shows patterns defined by mesh lines and void spaces. For ease of distinction, portions of the patterns are colored. FIG. 15A shows one group pattern GRP, and FIG. 15B shows a modified pattern corresponding to the group pattern GRP. Hereinafter, the cut-away patterns according to the present exemplary embodiment will be described in detail with reference to FIGS. 14 to 16C.

Figure 16A:
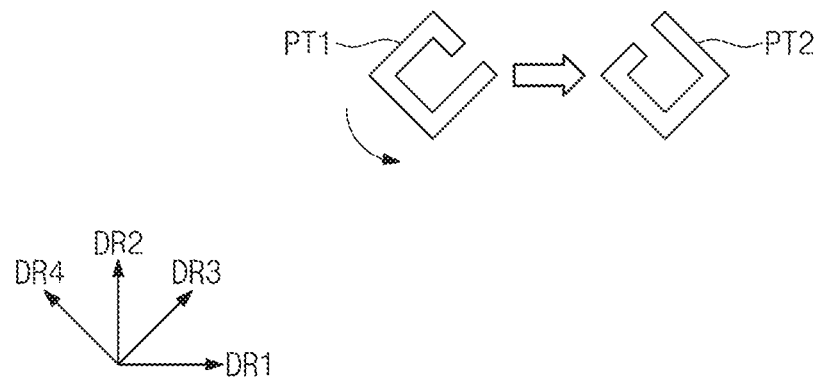
FIGS. 16A to 16C are exploded partial top schematic plan views showing selected ones of the features shown in FIG. 15A.
Figure 16B:
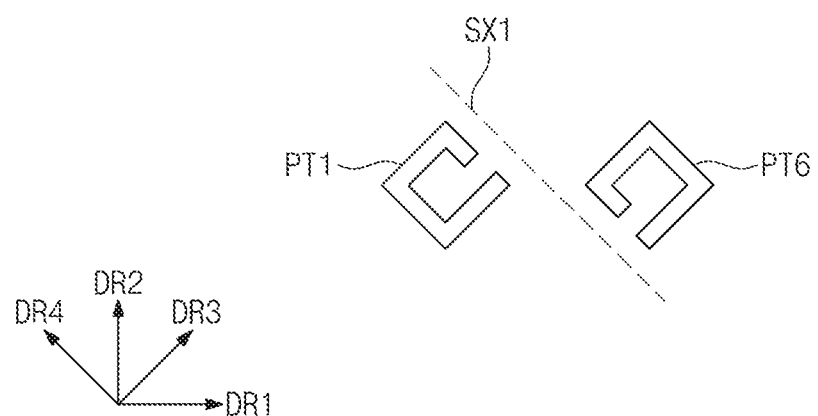
Figure 16C:
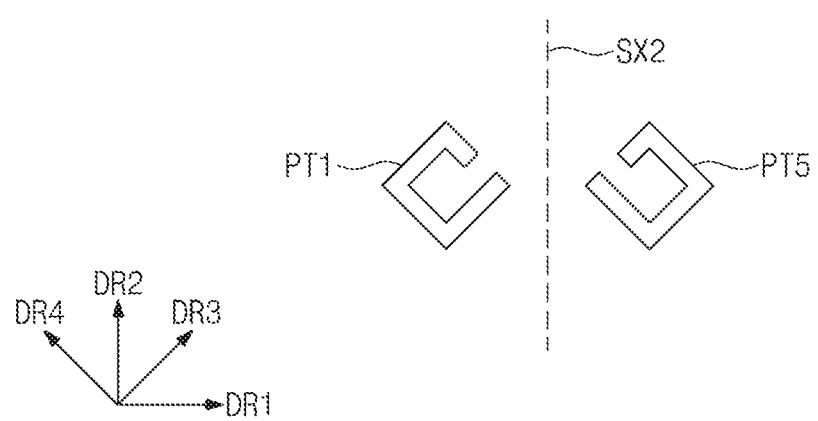

The embodiment of FIG. 14 shows area KK' of FIG. 13A with certain features emphasized. FIG. 15A shows certain components of embodiment of FIG. 12 to FIG. 14. FIG. 15B shows a comparative example of the components shown in FIG. 15A. FIGS. 16A to 16C show selected ones of the features shown in FIG. 15A.

Referring to FIG. 14, first, second, third cut-away patterns GP1 (see FIG. 13A to FIG. 13C, e.g.), GP2-3, and GP3-3 are defined by cutting away portions of the mesh lines MSL. The second and third cut-away patterns GP2-3 and GP3-3 are connected to each other, and the mesh lines MSL are disposed in peripheral areas of the second and third cut-away patterns GP2-3 and GP3-3.

As described above, the boundary BL-1 (refer to FIG. 13A) is defined by the second and third cut-away patterns GP2-3 and GP3-3 connected to each other. At least a portion of the second cut-away patterns GP2-3 is connected to at least a portion of the third cut-away patterns GP3-3 to define the boundary BL-1.

Meanwhile, each of the first and second sensor parts SP1-5 and SP2-5 may be the conductive pattern having the bulk structure. In such embodiments, the first, second, and third cut-away patterns GP1, GP2, and GP3 and the boundary BL may be openings defined through at least the portion of the conductive pattern that is integrally formed in a single unit.

The second cut-away pattern GP2-3 and the third cut-away pattern GP3-3 are shown in FIG. 14 from the group pattern GRP. As shown in the embodiment of FIG. 15A, the group pattern GRP includes first, second, third, and fourth patterns PT1, PT2, PT3, and PT4 arranged in the fourth direction DR4 and adjacent to the first area AR11 of the first sensor part among the second cut-away patterns GP2, fifth, sixth, seventh, and eighth patterns PT5, PT6, PT7, and PT8 arranged in the fourth direction DR4 and adjacent to the first area AR21 of the second sensor part among the second cut-away patterns GP2, ninth, tenth, eleventh, and twelfth patterns PT9, PT10, PT11, and PT12 extending in the third direction DR3 among the third cut-away patterns GP3, and thirteenth, fourteenth, fifteenth, and sixteenth patterns PT13, PT14, PT15, and PT16 extending in the fourth direction DR4 among the third cut-away patterns GP3.

The first, second, third, and fourth patterns PT1, PT2, PT3, and PT4 respectively face the fifth, sixth, seventh, and eighth patterns PT5, PT6, PT7, and PT8 in the third direction DR3. The first, second, third, and fourth patterns PT1, PT2, PT3, and PT4 and the fifth, sixth, seventh, and eighth patterns PT5, PT6, PT7, and PT8 are arranged along the third and fourth directions DR3 and DR4 with the first cut-away patterns GP1 adjacent thereto.

The ninth, tenth, eleventh, and twelfth patterns PT9, PT10, PT11, and PT12 respectively connect the first, second, third, and fourth patterns PT1, PT2, PT3, and PT4 and the fifth, sixth, seventh, and eighth patterns PT5, PT6, PT7, and PT8. Accordingly, the first and fifth patterns PT1 and PT5 facing each other in the third direction DR3 are connected to each other by the ninth pattern PT9, the second and sixth patterns PT2 and PT6 facing each other in the third direction DR3 are connected to each other by the tenth pattern PT10, the third and seventh patterns PT3 and PT6 facing each other in the third direction DR3 are connected to each other by the eleventh pattern PT11, and the fourth and eighth patterns PT4 and PT8 facing each other in the third direction DR3 are connected to each other by the twelfth pattern PT12.

Meanwhile, the ninth, tenth, eleventh, and twelfth patterns PT9, PT10, PT11, and PT12 are overlapped with each other in the fourth direction DR4. In the present exemplary embodiment, the ninth, tenth, eleventh, and twelfth patterns PT9, PT10, PT11, and PT12 are arranged in the fourth direction DR4.

In the exemplary embodiment illustrated, each of the third cut-away patterns connects the second cut-away patterns adjacent to each other. For instance, the thirteenth, fourteenth, fifteenth, and sixteenth patterns PT13, PT14, PT15, and PT16 connect patterns adjacent to each other among the first, second, third, and fourth patterns PT1, PT2, PT3, and PT4 and patterns adjacent to each other among the fifth, sixth, seventh, and eighth patterns PT5, PT6, PT7, and PT8.

In the exemplary embodiment illustrated, the thirteenth pattern PT13 connects the first pattern PT1 and the second pattern PT2, the fourteenth pattern PT14 connects the sixth pattern PT6 and the seventh pattern PT7, the fifteenth pattern PT15 connects the third pattern PT3 and the fourth pattern PT4, and the sixteenth pattern PT16 is connected to the eighth pattern PT8 to connect the group pattern GRP shown in FIG. 15A to another group pattern (not shown) adjacent to the group pattern GRP shown in FIG. 15A.

As described above, one second cut-away pattern is connected to one third cut-away pattern to define one space pattern. Accordingly, one group pattern GRP may be defined by space patterns connected to each other. In this case, the space patterns defining the one group pattern GRP may have the same shape each other or different shapes from each other.

FIG. 15B shows a modified pattern GRP-E obtained by modifying the group pattern GRP. Referring to FIG. 14 through FIG. 15B, the second and third cut-away patterns defining the one space pattern may have substantially the same shape as the first cut-away pattern GP1 through the modification. When the third cut-away pattern GP3-3 moves to the void space of the second cut-away pattern GP2-3 along an arrow direction shown in FIG. 15B, the modified pattern GRP-E may be defined.

For instance, the ninth pattern PT9 is inserted into the cut-away portion of the fifth pattern PT5 to form the first cut-away pattern GP1 having the closed-loop shape. In addition, the thirteenth pattern PT13 is inserted into the cut-away portion of the first pattern PT1 to form the first cut-away pattern GP1 having the closed-loop shape.

Accordingly, one group pattern GRP has substantially the same shape and arrangement as those of the first cut-away patterns GP1 corresponding to the one group pattern GRP. Exemplary embodiments such as this may allow a total amount of the void spaces to be constant in the center areas CA in which the first cut-away patterns GP1 are arranged and in the peripheral area PA in which the second and third cut-away patterns GP2-3 and GP3-3 are arranged. Thus, a reflectance of the external light in the center areas CA and a reflectance of the external light in the peripheral area PA may be maintained to be the same, and thus the patterns may be prevented from being perceived in the reflected light.

Referring to FIG. 15A again, the thirteenth, fourteenth, fifteenth, and sixteenth patterns PT13, PT14, PT15, and PT16 are not overlapped with each other in the third direction DR3. Accordingly, the first pattern PT1 and the second pattern PT2 are connected to each other by the thirteenth pattern PT13, and thus the fifth pattern PT5 is not directly connected to the sixth pattern PT6.

Meanwhile, the third cut-away patterns GP3 are disposed adjacent to each other. For instance, the thirteenth pattern PT13 and the tenth pattern PT10 are disposed adjacent to each other and connected to the second pattern PT2, the fourteenth pattern PT14 and the eleventh pattern PT11 are disposed adjacent to each other and connected to the seventh pattern PT7, and the fifteenth pattern PT15 and the twelfth pattern PT12 are disposed adjacent to each other and connected to the fourth pattern PT4. Although not shown in figures, the ninth pattern PT9 is disposed adjacent to the third cut-away pattern used to connect another group pattern.

The boundary BL-1 is defined by at least a portion of the group pattern GRP. The third cut-away patterns GP3 forms a portion of the boundary BL-1, and a portion of the second cut-away patterns partially forms another portion of the boundary BL-1.

The boundary BL-1 is defined by the third cut-away patterns and three side portions of the second cut-away pattern including a cut-away one side portion connected to the third cut-away pattern among second cut-away patterns of the group pattern GRP.

In detail, the boundary BL-1 is defined by successively connecting the ninth pattern PT9, three side portions of the first pattern PT1 except for a cut-away one side portion, the thirteenth pattern PT13, the tenth pattern PT10, three side portions of the sixth pattern PT6 except for a cut-away one side portion, the fourteenth pattern PT14, the eleventh pattern PT11, three side portions of the third pattern PT3 except for a cut-away one side portion, the fifteenth pattern PT15, the twelfth pattern PT12, and three side portions of the eighth pattern PT8 except for a cut-away one side portion in the group pattern GRP. However, the shape of the boundary BL-1 should not be limited thereto or thereby. That is, the boundary BL-1 may be defined in various ways without being limited to a specific shape.

Hereinafter, the patterns defining the group pattern GRP will be described in detail with reference to FIGS. 15A, and 16A to 16C. The two second cut-away patterns arranged in one group pattern GRP have a symmetrical shape or substantially the same shape. As illustrated, and as defined in greater detail above, the symmetry includes a rotational symmetry, a linear symmetry, and a point symmetry (which is a combination of the linear symmetry and the rotational symmetry), depending on which ones of the second cut-away patterns are being compared.

For instance, referring to FIG. 15A, in various exemplary embodiments, the first pattern PT1 and the third pattern PT3 may have substantially the same shape. The second pattern PT2 and the fourth pattern PT4 may have substantially the same shape. In other words, to arrive at the fourth pattern PT4 from the second pattern PT2, move the second pattern PT2, without rotating it about any axis, that is, keeping the same orientation of the second pattern PT2, to the location of the fourth pattern PT4.

As another example, in various exemplary embodiments, including in FIG. 15A, two patterns adjacent to each other in the fourth direction DR4 among the second cut-away patterns are rotationally symmetrical with each other. This symmetry is illustrated in detail in FIG. 16A. When the first pattern PT1 rotates in an arrow direction at an angle of about 90 degrees, the first pattern PT1 has the shape corresponding to that of the second pattern PT2. The first pattern PT1 and the second pattern PT2 face each other in the fourth direction DR4.

As yet another example, in various exemplary embodiments, including the embodiment of FIG. 15A, two patterns adjacent to each other in the first direction DR1 crossing the third and fourth directions DR3 and DR4 among the second cut-away patterns are linearly symmetrical with each other across a line extending in the fourth direction DR4. This symmetry is illustrated in detail in FIG. 16B. The first pattern PT1 is linearly symmetrical with the sixth pattern PT6 with respect to a symmetrical axis SX1.

The first pattern PT1 and the fifth pattern PT5 face each other in the third direction DR3. In this case, the symmetrical axis SX1 of the linear symmetry may be, but not limited to, a straight line extending in the fourth direction DR4.

As another example, two patterns adjacent to each other in the third direction DR3 among the second cut-away patterns illustrated in FIG. 15A are linearly symmetrical with each other along a line extending in the second direction DR2 as illustrated in detail in FIG. 16C. The first pattern PT1 is linearly symmetrical with the fifth pattern PT5 with respect to a symmetrical axis SX2.

The first pattern PT1 and the fifth pattern PT5 face each other in the third direction DR3. In this case, the symmetrical axis SX2 may be, but not limited to, a straight line extending in the first direction DR2 crossing the third and fourth directions DR3 and DR4.

In still another example, the second pattern PT2 and the sixth pattern PT6 face each other in the third direction, and the second pattern PT2 and the sixth pattern PT6 have a point symmetry with one another. That is, the second pattern PT2 and sixth pattern PT6 do not have the same shape and orientation. Further, rotating the second pattern PT2 does not result in the sixth pattern PT6. Finally, there is no axis about which the second pattern PT2 can be rotated to arrive at the sixth pattern PT6. However, the second pattern PT2 can be converted into the sixth pattern PT6 by an operation that both rotates about a point in the illustrated plane of FIG. 15A and an axis that extends in the third direction DR3 or in the fourth direction DR4.

For example, if the second pattern PT2 is rotated clockwise about 90 degrees, the sixth pattern PT6 may then be obtained by subsequently rotating about an axis that extends in the fourth direction DR4. Alternatively, if the second pattern is rotated counter-clockwise about ninety degrees, the sixth pattern PT6 may then be obtained by subsequently rotating about an axis that extends in the third direction DR3. This is referred to as point symmetry. Where a pattern lacks the same shape and orientation as another pattern, and where the patterns lack both rotational and linear symmetry, point symmetry exists between the two patterns if they are symmetrical upon applying both rotational and linear symmetry.

In an embodiment that includes the second and third cut-away patterns GP2-3 and GP3-3 defined in the peripheral area PA, the difference between the first sensor part SP1-5 and the second sensor part SP2-5 evident in patterns in reflected light may be reduced. Accordingly, the visibility of the electronic device may be improved since the first cut-away patterns GP1 are harder or impossible to be differentiated in the patterns in the reflection from the second and third cut-away patterns GP2-3 and GP3-3. Likewise, in various exemplary embodiments, the boundary BL-1 is less perceptible or is prevented from being differentiated from the first sensor part SP1-5 and the second sensor part SP2-5 in the reflected light.

Figure 17A:
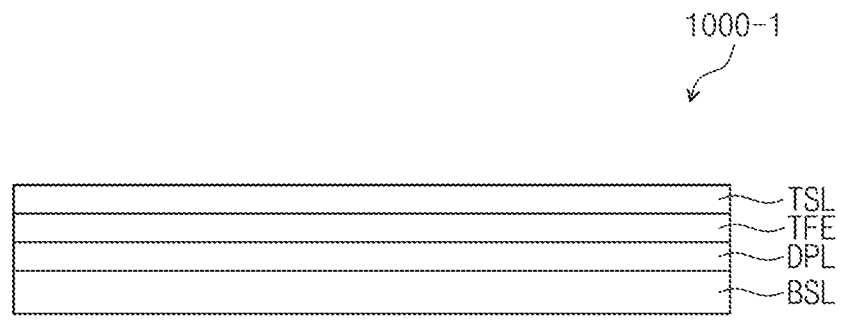
FIGS. 17A to 17C are cross-sectional views of the layers of exemplary embodiments of electronic devices constructed according to the principles of the invention.
Figure 17B:
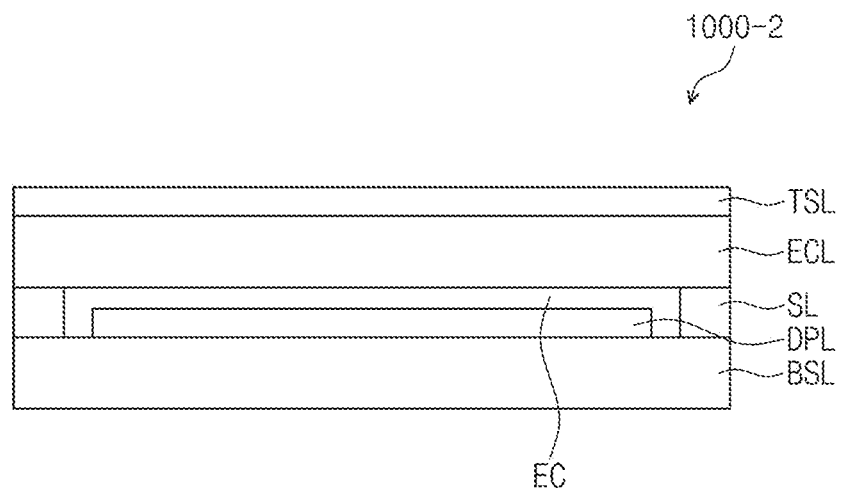
Figure 17C:
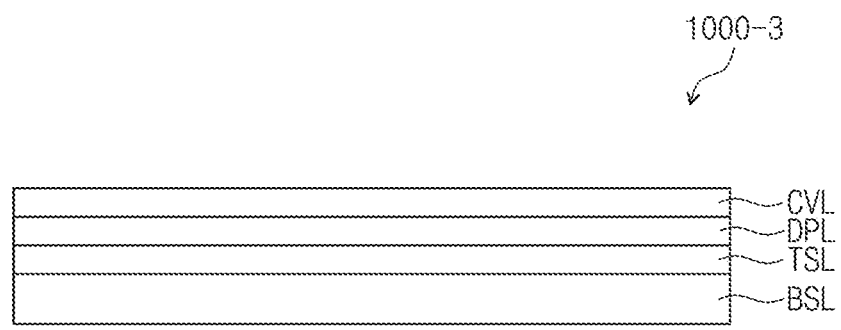

Hereinafter, various electronic devices 1000-1, 1000-2, and 1000-3 will be described in detail with reference to embodiments of FIGS. 17A to 17C. In FIGS. 17A to 17C, the same reference numerals denote the same elements in FIGS. 1 to 16C, and thus detailed descriptions of the same elements are unnecessary.

The electronic devices 1000-1, 1000-2, and 1000-3 may be touch screen panels displaying an image. Accordingly, each of the electronic devices 1000-1, 1000-2, and 1000-3 includes a display layer DPL in which a plurality of pixels displaying the image in response to electrical signals applied thereto are arranged.

Each of the pixels includes at least one driving device and a display device connected to the driving device. The driving device includes a thin film transistor and a capacitor. The display device includes a liquid crystal capacitor, an organic light emitting element, an electrophoretic element, or an electrowetting element.

Meanwhile, the display layer DPL may include various embodiments as long as the display layer DPL displays the image in response to the electrical signals.

As shown in FIG. 17A, the electronic device 1000-1 includes a base layer BSL, a display layer DPL, an encapsulation layer TFE, and a sensing layer TSL.

The base layer BSL includes a flexible insulating material. In this case, the base layer BSL may correspond to the base member 100 of the electronic device 1000 shown in FIG. 1.

The sensing layer TSL senses the touch event. The sensing layer TSL corresponds to the touch member 200 of the electronic device 1000 shown in FIG. 1.

The display layer DPL is disposed between the base layer BSL and the sensing layer TSL. The display layer DPL is operated in a front surface light emitting mode, a rear surface light emitting mode, or a both surface light emitting mode.

The encapsulation layer TFE is disposed between the display layer DPL and the sensing layer TSL. The encapsulation layer TFE has a structure in which a plurality of organic layers and/or a plurality of inorganic layers are stacked. The encapsulation layer TFE encapsulates the display layer DPL to prevent external moisture from entering into the display layer DPL.

The sensing layer TSL may be directly disposed on the encapsulation layer TFE. Accordingly, the electronic device 1000-1 may be slimmer, and thus the electronic device 1000-1 is more portable and easier to fold.

As shown in FIG. 17B, the electronic device 1000-2 includes a base layer BSL, a display layer DPL, an encapsulation part EC, a sealing part SL, an encapsulation layer ECL, and a sensing layer TSL. The encapsulation layer ECL may be, but need not be limited to, an insulating substrate or an insulating film.

The sensing layer TSL is disposed on the encapsulation layer ECL. The sensing layer TSL may be directly disposed on the encapsulation layer ECL. As another way, an insulating layer (not shown) may be further disposed between the sensing layer TSL and the encapsulation layer ECL.

The display layer DPL is disposed between the base layer BSL and the encapsulation layer ECL. The display layer DPL may be spaced apart from the encapsulation layer ECL.

The sealing part SL is disposed between the base layer BSL and the sealing layer ECL to couple the base layer BSL and the encapsulation layer ECL. The sealing part SL may be disposed along an edge of the base layer BSL. In addition, the sealing part SL defines a space between the base layer BSL and the encapsulation layer ECL and maintains a distance between the base layer BSL and the sealing layer ECL. The sealing part SL includes at least one of a resin material and a frit paste including a glass material.

The encapsulation part EC is filled in the space between the base layer BSL and the encapsulation layer ECL. The encapsulation part EC may be sealed by the sealing part SL.

The encapsulation part EC absorbs moisture therein and prevents external contaminant from entering into the display layer DPL. The encapsulation part EC may include a non-activated material, such as an inert gas, a fluid, etc.

As shown in FIG. 17C, the electronic device 1000-3 includes a base layer BSL, a sensing layer TSL, a display layer DPL, and a cover layer CVL. The sensing layer TSL is disposed between the base layer BSL and the display layer DPL. The sensing layer TSL senses a touch event occurring on a lower portion of the base layer BSL or a touch event occurring on the cover layer CVL in accordance with a driving method of the electronic device 1000-3. Other embodiments may be different.

The display layer DSP is electrically insulated from the sensing layer TSL and independently controlled. Although not shown in figures, an insulating layer (not shown) may be further disposed between the sensing layer TSL and the display layer DSP.

The cover layer CVL is disposed on the display layer DPL to cover the display layer DPL. The cover layer CVL protects the display layer DPL from external impacts. The cover layer CVL includes an insulating material.

In addition, the cover layer CVL may include a material having a high transmittance. In the case that the display layer DPL is operated in the front surface light emitting mode, the user may perceive the image through the cover layer CVL.

The electronic devices 1000-1, 1000-2, and 1000-3 according to the exemplary embodiments may sense the touch event and display the image at the same time. Accordingly, the electronic device may sense the user's input and provide information to the user in response to the user's input.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An electronic device comprising:
   a base member; and
   a touch member disposed on one surface of the base member and including first and second sensor parts spaced apart from each other with a boundary interposed therebetween, each of the first and second sensor parts including first and second areas disposed adjacent each other, each of the first and second sensor parts comprising:
   a plurality of first patterns in the first area spaced apart from each other, each of the first patterns having a first shape; and
   a plurality of second patterns in the second area spaced apart from the first patterns, each of the second patterns having a second shape different than the first shape, and
   wherein each of the first and second patterns is a cut-away pattern,
   wherein the first shape is a closed-loop shape that forms a floating pattern.

2. The electronic device of claim 1, the second shape is a partially open shape from the first shape.

3. The electronic device of claim 2, wherein each of the first and second sensor parts comprises a plurality of mesh lines, and the cut-away pattern is formed by cutting away at least a portion of the mesh lines from each of the first and second sensor parts.

4. The electronic device of claim 1, wherein the boundary is defined by the second area of the first sensor part and the second area of the second sensor part disposed adjacent to the second area of the first sensor part.

5. The electronic device of claim 4, wherein the first area has a shape defined by two sides extending in a first direction and two sides extending in a second direction intersecting the first direction, and the first patterns are arranged in a matrix form extending in the first and second directions.

6. The electronic device of claim 5, wherein the second area surrounds the first area.

7. The electronic device of claim 5, wherein the second patterns are aligned with the first patterns adjacent to the second patterns in the first direction or the second direction.

8. An electronic device comprising:
   a base member; and
   a touch member disposed on one surface of the base member and including first and second sensor parts spaced apart from each other with a boundary interposed therebetween, each of the first and second sensor parts including first and second areas disposed adjacent each other, each of the first and second sensor parts comprising:
   a plurality of first patterns in the first area spaced apart from each other, each of the first patterns having a first shape; and
   a plurality of second patterns in the second area spaced apart from the first patterns, each of the second patterns having a second shape different than the first shape, and
   wherein each of the first and second sensor parts comprises a plurality of mesh lines, and the each of the first and second patterns is formed by cutting away at least a portion of the mesh lines from each of the first and second sensor parts.

9. The electronic device of claim 8, wherein the first shape is a substantially closed-loop shape and the second shape is a partially open shape from the first shape.

10. The electronic device of claim 9, wherein each of the first and second sensor parts comprises a plurality of mesh lines, and a cut-away pattern is formed by cutting away at least a portion of the mesh lines from each of the first and second sensor parts.

11. The electronic device of claim 8, wherein the boundary is defined by the second area of the first sensor part and the second area of the second sensor part disposed adjacent to the second area of the first sensor part.

12. The electronic device of claim 11, wherein the first area has a shape defined by two sides extending in a first direction and two sides extending in a second direction intersecting the first direction, and the first patterns are arranged in a matrix form extending in the first and second directions.

13. The electronic device of claim 12, wherein the second area surrounds the first area.

14. The electronic device of claim 12, wherein the second patterns are aligned with the first patterns adjacent to the second patterns in the first direction or the second direction.

15. An electronic device comprising:
    a base member; and
    a touch member disposed on one surface of the base member and comprising a first sensor part, a second sensor part spaced apart from the first sensor part and insulated from the first sensor part, and a boundary interposed between the first sensor part and the second sensor part, each of the first and second sensor parts divided by a first area and a second area disposed adjacent to the first area, and each of the first and second sensor parts comprising:

a plurality of first cut-away patterns defined in the first area and spaced apart from each other, each of the first cut-away patterns having a closed-loop shape; and a plurality of second cut-away patterns defined in the second area and spaced apart from the first cut-away patterns, each of the second cut-away patterns having an incision shape obtained by cutting away a portion of the closed-loop shape, and wherein the boundary is defined by the second area of the first sensor part and the second area of the second sensor part disposed adjacent to the second area of the first sensor part, wherein each of the first and the second sensor parts comprises a plurality of mesh lines, the boundary is defined by spacing between the mesh lines of the first sensor part and the mesh lines of the second sensor part, the second cut-away patterns in the second area of the first sensor part is defined by cutting away a portion of the mesh lines of the first sensor part, and the second cut-away patterns in the second area of the second sensor part is defined by cutting away a portion of the mesh lines of the second sensor part.

16. The electronic device of claim 15, wherein the first area has a quadrangular shape defined by two sides extending in a first direction and two sides extending in a second direction crossing the first direction, and the first cut-away patterns are arranged in a matrix form defined by the first and second directions.

17. The electronic device of claim 16, wherein the second cut-away patterns are aligned with the first cut-away patterns adjacent to the second cut-away patterns among the first cut-away patterns along the first direction or the second direction, and wherein the second cut-away patterns arranged in the first direction among the second cut-away patterns of the first sensor part are aligned with the second cut-away patterns arranged in the first direction among the second cut-away patterns of the second sensor part along the second direction.

18. The electronic device of claim 17, wherein one second cut-away pattern among the second cut-away patterns has a same shape as a shape of another second cut-away pattern adjacent to the one second cut-away pattern among the second cut-away patterns.

19. The electronic device of claim 17, wherein one second cut-away pattern among the second cut-away patterns has a shape linearly symmetrical with a shape of another second cut-away pattern adjacent to the one second cut-away pattern among the second cut-away patterns.

20. The electronic device of claim 17, wherein one second cut-away pattern among the second cut-away patterns has a shape rotationally symmetrical with a shape of another second cut-away pattern adjacent to the one second cut-away pattern among the second cut-away patterns.

21. The electronic device of claim 16, further comprising a plurality of third cut-away patterns defined in the second areas, wherein each of the third cut-away patterns has a shape of the cut-away portion.

22. The electronic device of claim 21, wherein the third cut-away patterns are respectively connected to the second cut-away patterns.

23. The electronic device of claim 21, wherein the third cut-away patterns are connected to the boundary.

24. The electronic device of claim 21, wherein the second area comprises a plurality of protruding areas arranged spaced apart from each other, and wherein first protruding areas toward the second sensor part among the protruding areas of the first sensor part are alternately arranged with second protruding areas toward the first sensor part among the protruding areas of the second sensor part along the first direction or the second direction.

25. The electronic device of claim 24, wherein the boundary is defined along an outer side portion of the first protruding areas and an outer side portion of the second protruding areas.

26. The electronic device of claim 24, wherein each of the first and second protruding areas comprises a first sub-area in which at least one second cut-away pattern of the second cut-away patterns is defined and a second sub-area in which at least one third cut-away pattern of the third cut-away patterns is defined.

27. The electronic device of claim 26, wherein the second cut-away pattern is connected to the boundary, and wherein a shape, which is defined by a portion surrounding the second sub-area and the third cut-away pattern connected to the portion surrounding the second sub-area, of the boundary corresponds to a shape of the second cut-away pattern defined in the first sub-area.

28. The electronic device of claim 27, wherein each of the first cut-away patterns has a quadrangular shape defined by four sides, each of the second cut-away patterns has a shape obtained by cutting away a portion of one side of the four sides of the quadrangular shape, and each of the third cut-away patterns has a shape corresponding to a portion of the one side of the quadrangular shape.

29. The electronic device of claim 15, wherein at least one of the first and the second sensor parts comprises a plurality of mesh lines, and each of the boundary, the first cut-away patterns, and the second cut-away patterns is defined by cutting away a portion of the mesh lines.

* * * * *